(12) United States Patent
Imig et al.

(10) Patent No.: US 9,195,739 B2
(45) Date of Patent: Nov. 24, 2015

(54) IDENTIFYING A DISCUSSION TOPIC BASED ON USER INTEREST INFORMATION

(75) Inventors: Scott K. Imig, Redmond, WA (US); Robert L. Rounthwaite, Fall City, WA (US); Matthew R. Richardson, Seattle, WA (US); Ryen W. White, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 12/389,390

(22) Filed: Feb. 20, 2009

(65) Prior Publication Data

US 2010/0228777 A1 Sep. 9, 2010

(51) Int. Cl.
G06F 17/00 (2006.01)
G06F 17/30 (2006.01)
H04L 12/18 (2006.01)

(52) U.S. Cl.
CPC ...... *G06F 17/30699* (2013.01); *G06F 17/3071* (2013.01); *H04L 12/1818* (2013.01)

(58) Field of Classification Search
CPC .................................................. G06F 17/30699
USPC ....................................................... 707/766
See application file for complete search history.

(56) References Cited

U.S. PATENT DOCUMENTS

| 5,063,600 A | 11/1991 | Norwood |
| 5,146,552 A | 9/1992 | Cassorla et al. |
| 5,708,825 A | 1/1998 | Sotomayor |
| 5,732,399 A | 3/1998 | Katiyar et al. |
| 5,761,436 A | 6/1998 | Nielsen |
| 5,806,079 A | 9/1998 | Rivette et al. |
| 5,996,006 A | 11/1999 | Speicher |
| 6,011,537 A | 1/2000 | Slotznick |
| 6,064,978 A | 5/2000 | Gardner et al. |
| 6,065,001 A | 5/2000 | Ohkubo et al. |
| 6,072,493 A | 6/2000 | Driskell et al. |
| 6,088,026 A | 7/2000 | Williams |
| 6,199,080 B1 | 3/2001 | Nielsen |
| 6,243,722 B1 | 6/2001 | Day et al. |

(Continued)

FOREIGN PATENT DOCUMENTS

| EP | 0913779 | 6/1999 |
| GB | 189818056 A | 5/1899 |

(Continued)

OTHER PUBLICATIONS

Chiou, et al., "Interest-based Peer Selection in P2P Network," Proceedings of the 2008 IEEE International Conference on Sensor Networks, Ubiquitous, and Trustworthy Computing, 2008, accessible at <<ftp://ftp.computer.org/press/outgoing/proceedings/sutc08/data/3158a549.pdf>>, 6 pages.

(Continued)

*Primary Examiner* — Ajith Jacob
(74) *Attorney, Agent, or Firm* — Stephen A. Wight; Judy Yee; Micky Minhas

(57) ABSTRACT

Functionality is described for identifying a discussion topic based on user interest information. The user interest information may originate from one or more sources, such as the user's search-related behavior. The functionality then provides an opportunity for the user to engage in a communication exchange associated with the identified discussion topic.

20 Claims, 13 Drawing Sheets

(56) References Cited

U.S. PATENT DOCUMENTS

| | | |
|---|---|---|
| 6,347,398 B1 | 2/2002 | Parthasarathy et al. |
| 6,356,922 B1 | 3/2002 | Schilit et al. |
| 6,438,564 B1 | 8/2002 | Morton et al. |
| 6,496,931 B1 | 12/2002 | Rajchel et al. |
| 6,513,013 B1 | 1/2003 | Stephanou |
| 6,535,889 B1 | 3/2003 | Headrick et al. |
| 6,549,916 B1 | 4/2003 | Sedlar |
| 6,598,046 B1 | 7/2003 | Goldberg et al. |
| 6,654,725 B1 | 11/2003 | Langheinrich et al. |
| 6,687,878 B1 | 2/2004 | Eintracht et al. |
| 6,724,403 B1 | 4/2004 | Santoro et al. |
| 6,728,752 B1 | 4/2004 | Chen et al. |
| 6,804,659 B1 | 10/2004 | Graham et al. |
| 6,829,585 B1 | 12/2004 | Grewal et al. |
| 6,865,713 B1 | 3/2005 | Bates et al. |
| 6,901,394 B2 | 5/2005 | Chauhan et al. |
| 6,904,392 B1 | 6/2005 | Marty et al. |
| 6,938,022 B1 | 8/2005 | Singhal |
| 6,956,593 B1 | 10/2005 | Gupta et al. |
| 6,957,233 B1 | 10/2005 | Beezer et al. |
| 7,013,478 B1 | 3/2006 | Hendricks et al. |
| 7,058,726 B1 | 6/2006 | Osaku et al. |
| 7,062,510 B1 | 6/2006 | Eldering |
| 7,072,888 B1 | 7/2006 | Perkins |
| 7,107,518 B2 | 9/2006 | Ramaley et al. |
| 7,143,091 B2 | 11/2006 | Charnock et al. |
| 7,280,995 B1 | 10/2007 | Sedlar |
| 7,319,992 B2 * | 1/2008 | Gaos ................. 706/62 |
| 7,392,185 B2 | 6/2008 | Bennett |
| 7,409,384 B2 | 8/2008 | Szeto et al. |
| 7,596,578 B1 | 9/2009 | Marks |
| 7,653,627 B2 | 1/2010 | Li et al. |
| 7,668,748 B1 | 2/2010 | Veach |
| 7,756,756 B1 | 7/2010 | Lifson |
| 8,069,194 B1 | 11/2011 | Manber et al. |
| 2001/0032244 A1 | 10/2001 | Neustel |
| 2001/0042098 A1 | 11/2001 | Gupta et al. |
| 2002/0001436 A1 | 1/2002 | Park |
| 2002/0032839 A1 | 3/2002 | Yamamoto et al. |
| 2002/0052925 A1 | 5/2002 | Kim et al. |
| 2002/0055880 A1 | 5/2002 | Unold et al. |
| 2002/0078088 A1 | 6/2002 | Kuruoglu et al. |
| 2002/0081020 A1 | 6/2002 | Shimazu |
| 2002/0133628 A1 | 9/2002 | Asplund et al. |
| 2003/0023679 A1 | 1/2003 | Johnson et al. |
| 2003/0093276 A1 | 5/2003 | Miller et al. |
| 2003/0101104 A1 | 5/2003 | Dimitrova et al. |
| 2003/0149694 A1 | 8/2003 | Ma et al. |
| 2003/0154248 A1 * | 8/2003 | Smith et al. ............ 709/204 |
| 2004/0044542 A1 | 3/2004 | Beniaminy et al. |
| 2004/0059708 A1 | 3/2004 | Dean et al. |
| 2004/0066531 A1 | 4/2004 | Kim |
| 2004/0122912 A1 | 6/2004 | Kim et al. |
| 2004/0133468 A1 | 7/2004 | Varghese |
| 2004/0138946 A1 | 7/2004 | Stolze |
| 2004/0163042 A1 | 8/2004 | Altman |
| 2004/0167928 A1 | 8/2004 | Anderson et al. |
| 2004/0250201 A1 | 12/2004 | Caspi |
| 2004/0252888 A1 | 12/2004 | Bargeron et al. |
| 2004/0260702 A1 | 12/2004 | Cragun et al. |
| 2005/0022122 A1 | 1/2005 | Barrus et al. |
| 2005/0027664 A1 | 2/2005 | Johnson et al. |
| 2005/0027696 A1 | 2/2005 | Swaminathan et al. |
| 2005/0028200 A1 | 2/2005 | Sardera |
| 2005/0038814 A1 | 2/2005 | Iyengar et al. |
| 2005/0050097 A1 | 3/2005 | Yeh et al. |
| 2005/0075886 A1 | 4/2005 | LeFebvre et al. |
| 2005/0078190 A1 | 4/2005 | Bloom et al. |
| 2005/0081159 A1 | 4/2005 | Gupta et al. |
| 2005/0091106 A1 | 4/2005 | Reller et al. |
| 2005/0096979 A1 | 5/2005 | Koningstein |
| 2005/0097440 A1 * | 5/2005 | Lusk et al. .......... 715/500.1 |
| 2005/0144064 A1 | 6/2005 | Calabria et al. |
| 2005/0160113 A1 | 7/2005 | Sipusic et al. |
| 2005/0183005 A1 | 8/2005 | Denoue et al. |
| 2005/0192822 A1 | 9/2005 | Hartenstein et al. |
| 2005/0222989 A1 | 10/2005 | Haveliwala et al. |
| 2005/0223315 A1 | 10/2005 | Shimizu et al. |
| 2005/0246736 A1 | 11/2005 | Beyda et al. |
| 2005/0256866 A1 | 11/2005 | Lu et al. |
| 2005/0289452 A1 | 12/2005 | Kashi et al. |
| 2006/0004711 A1 | 1/2006 | Naam |
| 2006/0041830 A1 | 2/2006 | Bohn |
| 2006/0047615 A1 | 3/2006 | Ravin et al. |
| 2006/0129536 A1 | 6/2006 | Foulger et al. |
| 2006/0149817 A1 | 7/2006 | Bou-Ghannam et al. |
| 2006/0218153 A1 | 9/2006 | Voon et al. |
| 2006/0242574 A1 | 10/2006 | Richardson et al. |
| 2007/0011155 A1 | 1/2007 | Sarkar |
| 2007/0174265 A1 | 7/2007 | Gorti et al. |
| 2007/0179945 A1 | 8/2007 | Marston et al. |
| 2007/0219794 A1 | 9/2007 | Park et al. |
| 2007/0233658 A1 | 10/2007 | Coughlin et al. |
| 2007/0259325 A1 | 11/2007 | Clapper |
| 2008/0104004 A1 | 5/2008 | Brave et al. |
| 2008/0144737 A1 | 6/2008 | Naguib |
| 2008/0162454 A1 | 7/2008 | Lundell et al. |
| 2008/0235189 A1 | 9/2008 | Rayman et al. |
| 2008/0294584 A1 * | 11/2008 | Herz .......................... 706/46 |
| 2008/0306935 A1 | 12/2008 | Richardson et al. |
| 2009/0080635 A1 | 3/2009 | Altberg et al. |
| 2009/0307100 A1 | 12/2009 | Nguyen et al. |

FOREIGN PATENT DOCUMENTS

| | | |
|---|---|---|
| JP | 2001022788 | 1/2001 |
| JP | 2001142830 | 5/2001 |
| JP | 2001282092 | 10/2001 |
| JP | 2003178075 | 6/2003 |
| JP | 2004509415 | 3/2004 |
| JP | 2004348241 | 12/2004 |
| JP | 2005031780 | 2/2005 |
| KR | 20030082110 A | 10/2003 |
| TW | 200601082 | 1/2006 |
| TW | 200612262 | 4/2006 |
| WO | WO97/22109 | 6/1997 |
| WO | WO00/77690 | 12/2000 |
| WO | WO01/09738 A1 | 2/2001 |
| WO | WO01/42980 | 6/2001 |
| WO | WO01/98911 A1 | 12/2001 |
| WO | WO02/35324 | 5/2002 |
| WO | WO02101483 A2 | 12/2002 |
| WO | WO03/023631 | 3/2003 |
| WO | WO2004079522 A2 | 9/2004 |
| WO | WO2005/089291 | 9/2005 |
| WO | WO2005/096750 | 10/2005 |
| WO | WO2008150672 A1 | 12/2008 |

OTHER PUBLICATIONS

Busnel, et al., "PROXSEM: Interest-based Proximity Measure to Improve Search Efficiency inP2P Systems," Proceedings of the Fourth European Conference on Universal Multiservice Networks (ECUMN'07), 2007, accessible at <<http://www.irisa.fr/asap/intranet/proxsem-interest-based-proximity-measure-to-improve-search-efficiency-in-p2p-systems.pdf/attachment_download/file>>, 10 pages.

Rayan, et al., "Personalized Content Search and Retrieval in an Interest Group Environment," 2007, accessible at <<http://www.hipc.org/hipc2007/posters/content-search.pdf>>, 4 pages.

Singh, et al., "Determining User's Interest in Real Time," Proceeding of the 17th international conference on World Wide Web, 2008, accessible at <<http://www2008.org/papers/pdf/p1115-sanasam.pdf>>, 2 pages.

Godoy, et al., "An Agent-Based Recommender System to Support Collaborative Web Search Based on Shared User Interests," J.M. Haake, S.F. Ochoa, and A. Cechich (Eds.), CRIWG 2007, LNCS 4715, Springer-Verlag Berlin Heidelberg, 2007, pp. 303-318.

Zhang, et al., "Building Interest-Oriented Web Search Union," Seventh International Conference on Parallel and Distributed Computing, Applications and Technologies, 2006, Dec. 2006, pp. 327-332.

(56) References Cited

OTHER PUBLICATIONS

Garner, et al., "Integrating Search and Social Media," accessible at <<http://www.icrossing.com/articles/Integrating%20Search%20and%20Social%20Media.pdf>>, Sep. 15, 2008, 8 pages.
Freyne, et al., "Toward the Exploitation of Social Access Patterns for Recommendation," Proceedings of the 2007 ACM Conference on Recommender Systems, accessible at <<http://www.csi.ucd.ie/UserFiles/publications/1182162672681.pdf>>, 2007, 4 pages.
Freyne, et al., "Collecting Community Wisdom: Integrating Social Search & Social Navigation," Proceedings of the 12th international conference on Intelligent user interfaces, 2007, available at <<http://citeseerx.ist.psu.edu/viewdoc/download;jsessionid=F396AC79ACDC4D313A0365DBA81A8469?doi=10.1.1.89.1438&rep=rep1&type=pdf>>, 10 pages.
Morris, Meredith Ringel, "Collaborative Search" research page, accessible at <<http://research.microsoft.com/en-us/um/people/merrie/collaborative_search.html>>, 2 pages.
Kiciman, et al., "URANK" product description, accessible at <<http://research.microsoft.com/en-us/projects/urank/>>, 3 pages.
Morris, Meredith Ringel, "A Survey of Collaborative Web Search Practices," Proceeding of the Twenty-Sixth Annual SIGCHI Conference on Human Factors in Computing Systems, 2008, accessible at <<http://research.microsoft.com/en-us/um/people/merrie/papers/collab_search_survey.pdf>>, 4 pages.
Amershi, et al., "CoSearch: A System for Co-located Collaborative Web Search," Proceeding of the Twenty-Sixth Annual SIGCHI Conference on Human Factors in Computing Systems, 2008, accessible at <<http://research.microsoft.com/en-us/um/people/merrie/papers/cosearch.pdf>>, 10 pages.
Morris, et al., "Enhancing Collaborative Web Search with Personalization: Groupization, Smart Splitting, and Group Hit-Highlighting," Proceedings of the ACM 2008 Conference on Computer Supported Cooperative Work, 2008, accessible at <<http://research.microsoft.com/en-us/um/people/merrie/papers/groupization_cscw08.pdf>>, 4 pages.
Morris, Meredith Ringel, "Interfaces for Collaborative Exploratory Web Search: Motivations and Directions for Multi-User Designs," CHI 2007 Workshop on Exploratory Search and HCI, 2007, accessible at << http://research.microsoft.com/en-us/um/people/merrie/papers/merrie_exploratory_search_wkshop_camera_ready.pdf>>, 4 pages.
Morris, et al., "Shared Sensemaking: Enhancing the Value of Collaborative Web Search Tools," CHI 2008 Workshop on Sensemaking, 2008, accessible at << http://research.microsoft.com/en-us/um/people/merrie/papers/merrie_sensemaking_workshop_final.pdf>>, 5 pages.
Morris, et al., "S3: Storable, Shareable Search," Interact 2007, accessible at <<http://research.microsoft.com/en-us/um/people/horvitz/s3.pdf>>, 4 pages.
Morris, et al., "SearchBar: A Search-Centric Web History for Task Resumption and Information Re-finding," Proceeding of the Twenty-Sixth Annual SIGCHI Conference on Human Factors in Computing Systems, 2008, Accessible at <<http://research.microsoft.com/apps/pubs/default.aspx?id=64276>>, 10 pages.
Morris, et al., "SearchTogether: An Interface for Collaborative Web Search," Proceedings of the 20th Annual ACM Symposium on User interface Software and Technology, 2007, accessible at <<http://research.microsoft.com/en-us/um/people/merrie/papers/searchtogether.pdf>>, 10 pages.
Mexican Office Action received Apr. 24, 2012 for Mexican patent application No. MX/a/2007/013091, a counterpart foreign application of U.S. Pat. No. 7,734,631, 3 pages.
Office Action for U.S. Appl. No. 12/796,379, mailed on Apr. 13, 2012, Matthew R. Richardson, "Associating information with an electronic document", 29 pgs.
Japanese Office Action mailed Jun. 15, 2012 for Japanese patent application No. 2008-508880, a counterpart foreign application of U.S. Pat. No. 7,734,631, 6 pages.
Korean Office Action mailed Aug. 13, 2012 for Korean patent application No. 10-2007-7024625, a counterpart foreign application of U.S. Pat. No. 7,734,631, 4 pages.
Office action for U.S. Appl. No. 12/796,379, mailed on Aug. 1, 2012, Richardson et al., "Associating information with an electronic document", 30 pages.
Translated Japanese Office Action mailed Sep. 16, 2011 for Japanese patent application No. 2008-508880, a counterpart foreign application of U.S. Pat. No. 7,734,631, 5 pages.
Mexican Office Action mailed Apr. 1, 2011 for Mexican patent application No. MX/a/2007/013091, a counterpart foreign application os U.S. Pat. No. 7,734,631, 4 pages.
Ask.com home page, accessible at <<http://www.ask.com>>, accessed on Sep. 15, 2008,1 page.
ChaCha.com home page, accessible at <<http://www.chacha.com>>, accessed on Sep. 15, 2008, 2 pages.
Chellapilla, et al., "Improving Cloaking Detection Using Search Query Popularity and Monetizability," retrieved from <<http://research.microsoft.com/kumarc/pubs/chellapilla_airweb2006.pdf>>, AIRWeb'06 Seattle, Washington, USA, Aug. 10, 2006, 7 pages.
Cowie, et al., "Automatic Question Answering", Proceedings of RIAO 2000, accessible at <<http://iliLumbc.edu/SergeiPub/AutomaticQA2000.pdf>>, Apr. 2000, 10 pages.
Gaim-Encryption, Product Manual (Online), Publisher Unknown, Mar. 25, 2004, retrieved Jul. 1, 2007 at <<http://www.gaim-encryption.sourceforge.net>> Last accessed Jan. 25, 2008 (Gaim-Encryption is now Pidgin-Encryption—<<http://sourceforge.net/projects/gaim-encryption>>).
Goodman, et al., "Implicit Queries for Email," retrieved at <<http://www.cs.cmu.edu/vitor/papers/ceas05.pdf>>, CEAS 2005, Jul. 21-22, 2005, 9 pages.
Kwok, et al., "Scaling Question Answering to the Web," accessible at <<http://www.cs.washington.edu/homes/weld/papers/mulder-www10.pdf>>, Nov. 13, 2000, pp. 1-22.
Leidner, et al., "Evaluating Question Answering Systems Using FAQ Answer Injection," Proceedings of the 6th Annual CLUK Research Colloquium, accessible at <<http://www.cs.jhu.edu/-ccb/publications/evaluating-question-answering-systems-using-faq-answer-injection.pdf>>, Jan. 2003, 6 pages.
Maybury, et al., "Virtually Integrated Visionary Intelligence Demonstration (VIVID)," accessible at <<https://analysis.mitre.org/proceedings/FinaLPapers_Files/271_C amera_Ready_Paper.pdf>>, Feb. 2005, 6 pages.
Noda, et al., "Benchmark Study of Desktop Search Tools," retrieved from <<http://www.uwebc.org/opinionpapers/archives/docs/desktop_search_04282005.pdf>>, UW E-Business Consortium, University of Wisconsin-Madison, Apr. 20, 2005, 15 pages.
"RaptiveX RapEngine ActiveX Instant Messaging OCX 1.5," Datasheet (Online), Rapman.com, Aug. 3, 1999, retrieved Jul. 1, 2007 from <<http:/www.freedownloadscenter.com/Network_and_Internet/Conferencing_and_Collaboration_Tools/RaptiveX_RapEngine_ActiveX_Instant_Messaging_OCX.html, 2 pgs.
Vijayakumar, et al., "Digital Reference Service: Libraries Online 24/7," accessible at <<http://eprints.rclis.org/archiveI00005667/01/vijayakumarjk_16.pdf>>, Proceedings of SIS-2005, Visakhapatanam, Jan. 2005, 5 pages.
Windows Live QnA home page, accessible at <<http://qna.live.com>>, accessed on Sep. 15, 2008, 2 pages.
Yahoo Answers home page, accessible at <<http://answers.yahoo.com>>, accessed on Sep. 15, 2008, 2 pages.
Office Action for U.S. Appl. No. 11/761,047, mailed on May 13, 2011, Matthew R. Richardson, "Using Joint Communication and Search Data," 15 pages.
Office Action for U.S. Appl. No. 12/211,113, mailed on May 16, 2011, Matthew Richardson, "Balanced Routing of Questions to Experts," 30 pages.
Translated Japanese Office Action mailed Nov. 9, 2012 for Japanese patent application No. 2008-508880, a counterpart foreign application of U.S. Pat. No. 7,734,631, 6 pages.

(56) References Cited

OTHER PUBLICATIONS

Office action for U.S. Appl. No. 12/211,113, mailed on Oct. 10, 2013, Richardson, et al., "Balanced Routing of Questions to Experts", 17 pages.
Office action for U.S. Appl. No. 12/796,379, mailed on Nov. 27, 2013, Richardson, et al., "Associating information with an electronic document", 25 pages.
Office action for U.S. Appl. No. 12/796,379, mailed on May 24, 2013, Richardson et al., "Associating information with an electronic document", 25 pages.
Taiwanese Office Action mailed Feb. 11, 2014 for Taiwan patent application No. 97119888, a counterpart foreign application of U.S. Pat. No. 8,150,868, 7 pages.
Non-Final Office Action for U.S. Appl. No. 12/796,379, mailed on Jul. 2, 2014, Richardson et al., "Associating information with an electronic document", 22 pages.
Office action for U.S. Appl. No. 12/796,379, mailed on Jan. 29, 2015, Richardson et al., "Associating information with an electronic document", 21 pages.

* cited by examiner

FIG. 3 (COMMUNICATION SYSTEM 104)

IDENTIFYING A DISCUSSION TOPIC BASED ON USER INTEREST INFORMATION

BACKGROUND

The Internet and other network environments provide numerous mechanisms that allow a user to obtain desired information or engage in desired communicative experience. One such mechanism uses search engine technology. According to a typical user experience, a user enters one or more search terms into a search engine. The search engine responds by presenting a list of network resources which potentially match the interests of the user.

Another mechanism may use various types of network-enabled communication exchanges, such as chat-type exchanges, message board-type exchanges, instant messenger-type exchanges, voice-over-IP exchanges, and so forth. According to a typical user experience, a user manually identifies a provider which hosts a communication exchange which appears to match the prevailing interests of the user. The user may then engage in a discussion with other participants of the selected communication exchange.

SUMMARY

An approach is described for facilitating a communication exchange by identifying a discussion topic. In one illustrative implementation, the approach involves receiving interest information that identifies at least one interest of a user. The approach then involves associating the user with an identified topic (or multiple topics) based on the interest information. In one illustrative implementation, the identified topic is selected from, or, more generally, selected with reference to, a collection of static and/or dynamic topics. The approach then involves providing an opportunity for the user to participate in at least one communication exchange relating to the identified topic.

The above approach allows a user who is exhibiting behavior indicative of an interest in a particular topic (or who can otherwise be associated with interest in the topic) to be seamlessly integrated into a communication exchange which addresses that topic. In one scenario, for instance, the user may enter a query into a search engine and then access one or more network resources (e.g., web sites) identified by the search engine. This network activity reflects the user's prevailing interest or interests. In this example, the approach provides a useful way to supplement the user's search experience by providing a relevant communication exchange to the user. Alternatively, if the user is more interested in conducting a discussion rather than performing a search, the approach provides a useful interface for directing the user to a relevant communication exchange.

According to another illustrative aspect, the communication exchange may be implemented using a chat-type communication system or a message board-type communication system, or some combination thereof. Other types of message exchanges (and combinations thereof) can also be used.

The above approach can be manifested in various types of systems, components, methods, computer readable media, data structures, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure sets forth an approach for using interest information to identify at least one discussion topic, thereby facilitating a communication exchange that pertains to the discussion topic.

This disclosure is organized as follows. Section A describes an illustrative system for facilitating a communication exchange. Section B describes illustrative methods which explain the operation of the system of Section A. Section C describes illustrative processing functionality that can be used to implement any aspect of the features described in Sections A and B.

Figure 13:
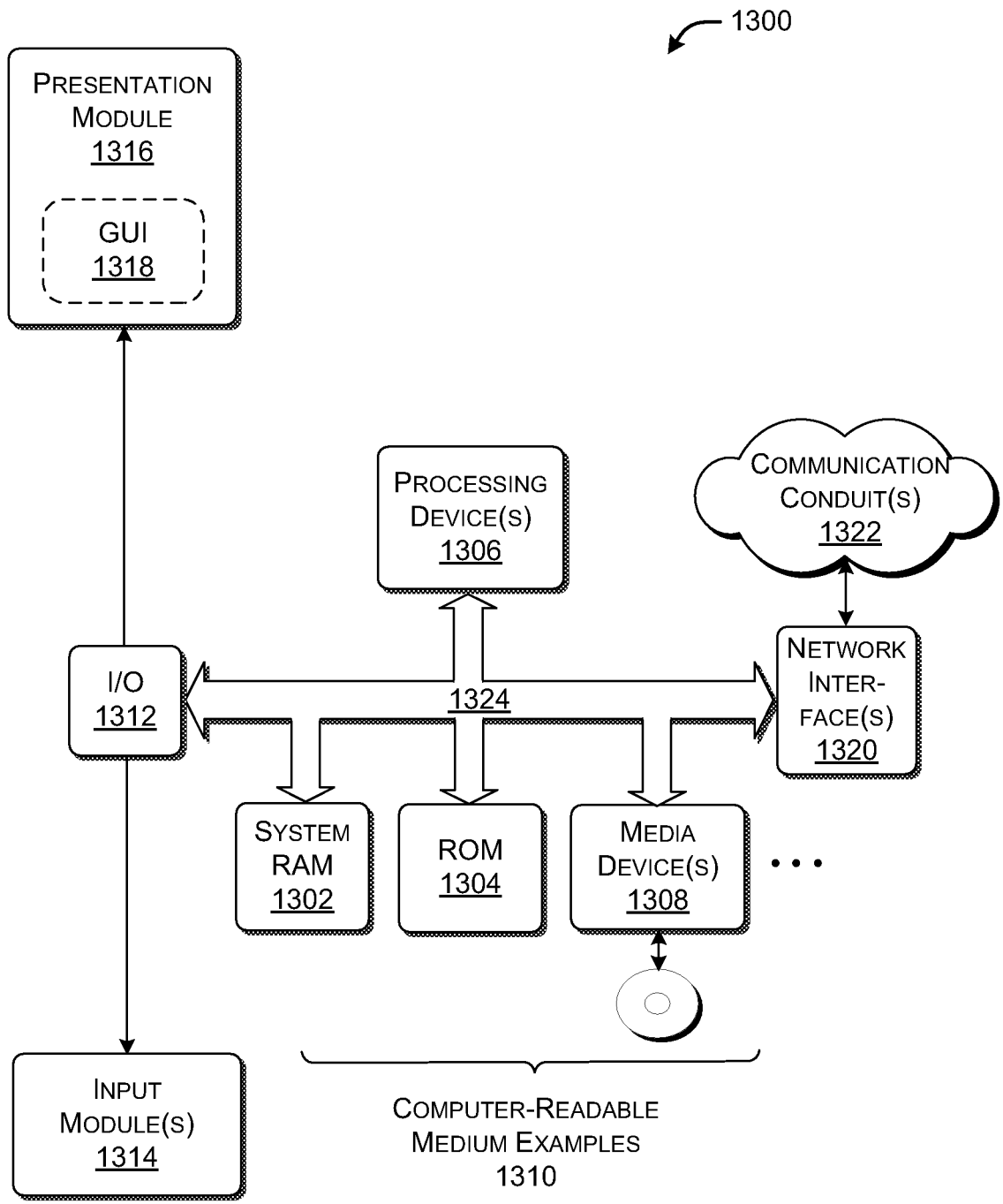
FIG. 13 shows illustrative processing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner, for example, by software, hardware (e.g., discrete logic components, etc.), firmware, and so on, or any combination of these implementations. In one case, the illustrated separation of various components in the figures into distinct units may reflect the actual use of corresponding distinct components. Alternatively, or in addition, any single component illustrated in the figures may be implemented by plural components. Alternatively, or in addition, the depiction of any two or more separate components in the figures may reflect different functions performed by a single component. FIG. 13, to be discussed in turn, provides additional details regarding one illustrative implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented by software, hardware (e.g., discrete logic components, etc.), firmware, manual processing, etc., or any combination of these implementations.

As to terminology, the phrase "configured to" encompasses any way that any kind of functionality can be constructed to perform an identified operation. The functionality can be configured to perform an operation using, for instance, software, hardware (e.g., discrete logic components, etc.), firmware etc., or any combination thereof.

The term "logic" encompasses any functionality for performing a task. For instance, each operation illustrated in the flowcharts corresponds to logic for performing that operation. An operation can be performed using, for instance, software, hardware (e.g., discrete logic components, etc.), firmware, etc., or any combination thereof.

A. Illustrative System

A.1. System Overview

Figure 1:
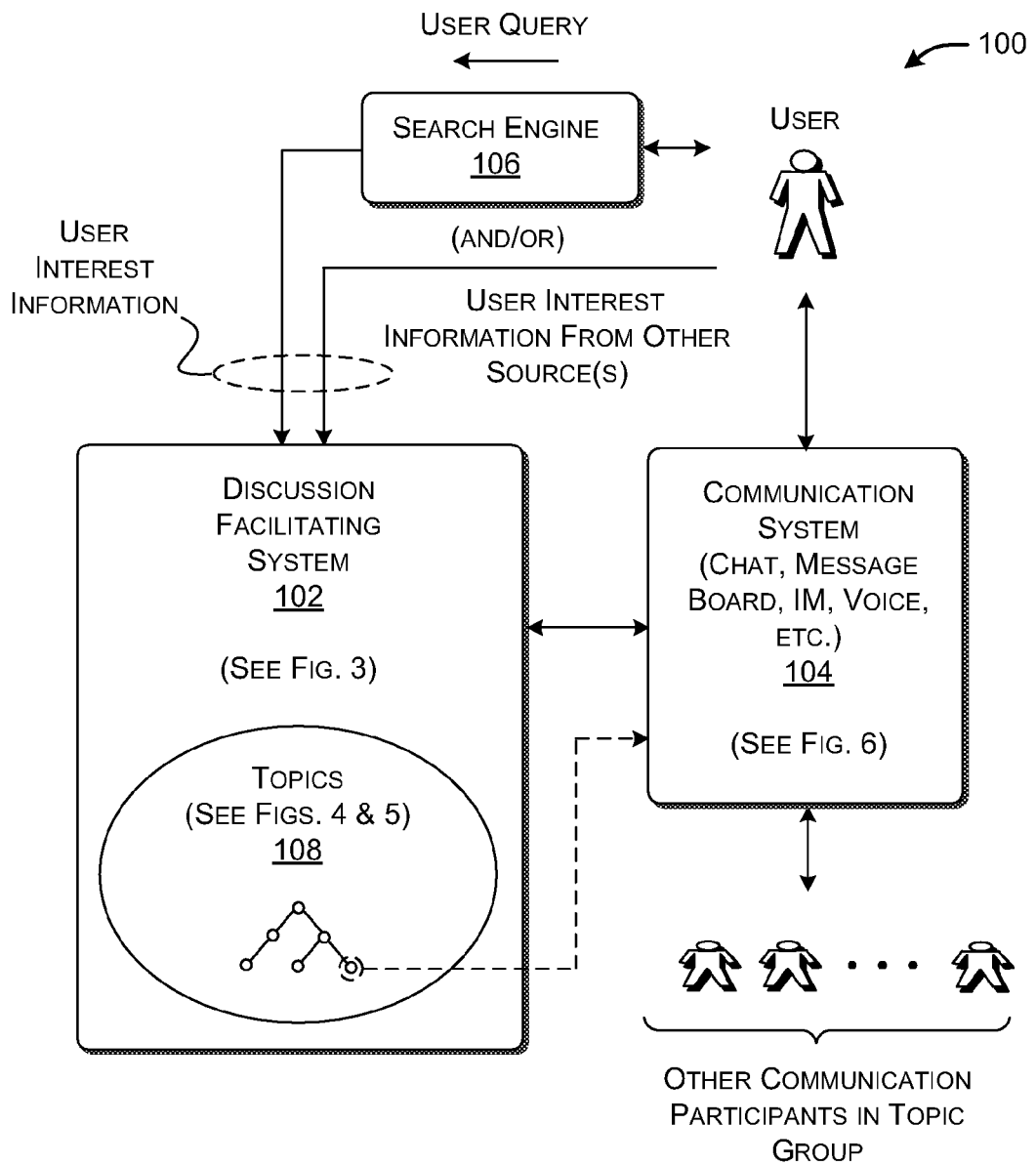
FIG. 1 shows an overview of an illustrative system for facilitating a communication exchange, including a discussion facilitating system and a communication system.
Figure 2:
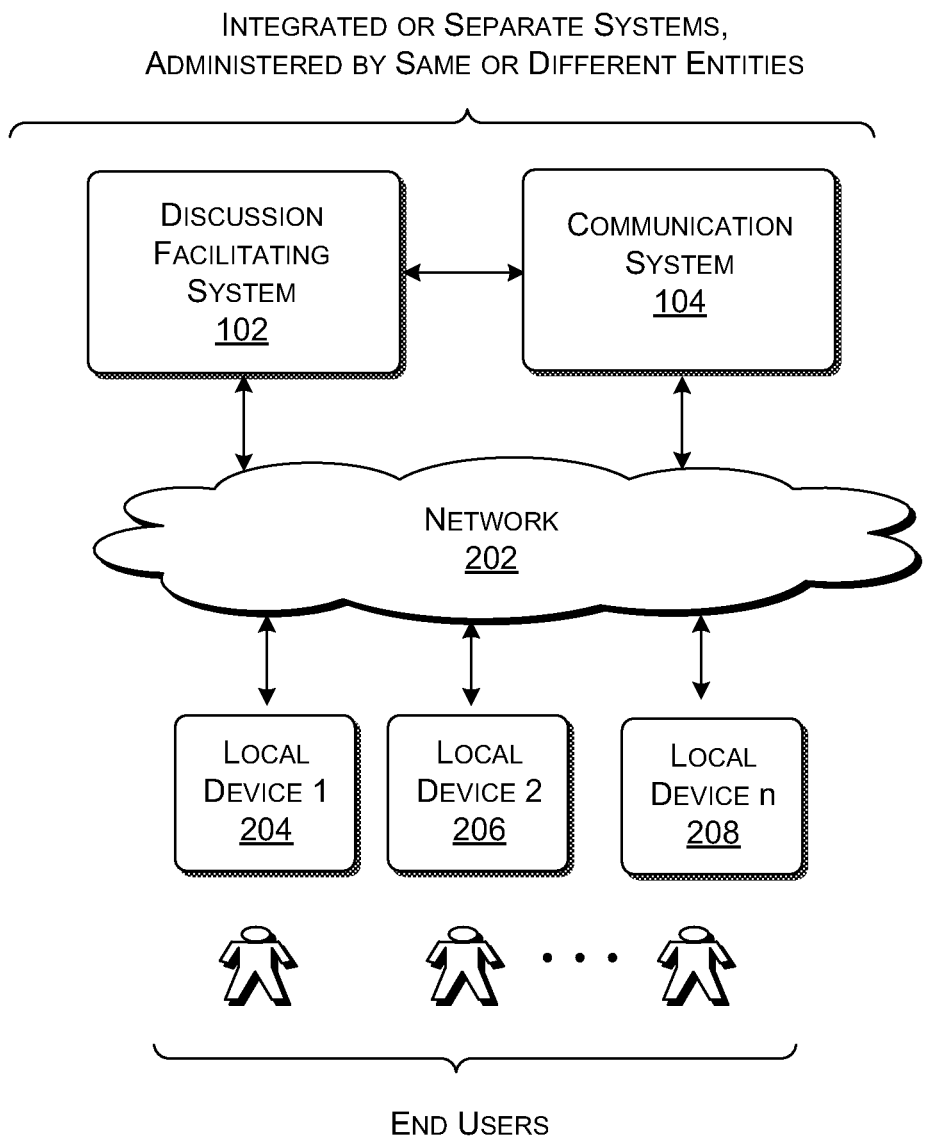
FIG. 2 shows one illustrative implementation of the system of FIG. 1.

FIG. 1 shows an illustrative electronic system 100 for facilitating a communication exchange between a user and one or more participants. Overall, the system 100 operates by identifying one or more communication exchanges that pertain to topics that are likely to match the interests of the user. To perform this task, the system 100 uses a discussion facilitating system 102 to identify one or more topics based, in part, on user interest information (referred to as "interest information" below for brevity). The system 100 uses a communication system 104 to implement one or more communication exchanges that relate to the identified topic or topics. FIGS. 1 and 2 present an overview of the system 100, while FIGS. 3-9 provide additional detail regarding individual features in the system 100.

To begin with, the term "topic" encompasses any type of categorizing principle on which a discussion may be based. In one case, a topic is defined with reference to a field of discussion. For example, a topic that pertains to dogs provides discussion content that is thematically "about" dogs. In another case, a topic is defined with reference to some property that may be at least partially orthogonal to any field of discussion. For example, a topic that pertains to "popular issues" can group together different types of popular subject matter. Still other organizing principles can be used to establish a topic.

The term interest information encompasses any kind of information that has a bearing on one or more interests of the user at a given time, obtained from any source or sources. As will be clarified with reference to FIG. 3, one or more components within the discussion facilitating module 102 can process the interest information. To facilitate explanation, the user's interests will be described below in the singular in some instances, although the interest information may represent plural interests of the user. Further, the user's interests will be described in the context of the user's current interests, although the interest information may also, or alternatively, represent the user's prior interests and/or future anticipated interests.

For example, the user may be interacting with a search engine 106. In this case, the discussion facilitating system 102 uses a current query that the user has forwarded to the search engine 106 as representative of the user's interest. In addition, or alternatively, the discussion facilitating system 102 may use the user's search history (including one or more prior queries entered by the user) as representative of the user's interest. In other words, the user's queries can be considered user interest information that represents the user's interests.

In addition, or alternatively, the user's interests can be represented by information regarding the network resources (e.g., web sites) that the user has accessed. In one case, for example, the discussion facilitating system 102 can receive information regarding the network resources that the user has accessed in association with the user's search-related activity. For example, the user may have accessed these network resources in direct response to search results provided by the search engine 106. In other cases, the user's resource selections may be more generally temporally correlated with his or her search-related activity.

The above types of interest information reflect the behavior of the user. In addition, or alternatively, the discussion facilitating system 102 may receive information that pertains to the non-behavioral characteristics of the user. For example, the discussion facilitating system 102 may receive information that identifies the gender of the user, the age of the user, the educational background of the user, the geographical location of the user, and so on. Still other fields of information may be used to assess the interests of the user.

In some cases, the discussion facilitating system 102 may automatically extract the interest information from available sources of such information. For example, the user's behavior in interacting with the search engine 106 and other network resources can be gleaned by examining an activity log (not shown) provided by the search engine 106. In addition, or alternatively, the user may expressly supply certain fields of interest information to the discussion facilitating system 102.

In general, the system 100 may include any number of features aimed at appropriately handling personal data associated with the user. For instance, the system 100 may include an opt-in (or opt-out) feature that allows a user to expressly authorize (or expressly prohibit) the collection of personal information regarding the user. More generally, the system 100 may allow the user to control the collection, dissemination, and deletion of any user-related information. Further, if authorized to collect the user-related information, the system 100 can maintain this information using appropriate safeguards to prevent unauthorized entities from accessing it.

As mentioned above, the discussion facilitating system 102 identifies a topic based, in part, on the interest information. (As will be explained below, the discussion facilitating system 102 can identify multiple topics that are pertinent to the interest information, but, at this juncture, the discussion facilitating system 102 is described as identifying a single topic). In one implementation, the discussion facilitating system 102 selects the topic from, or, more generally, with reference to, a collection of topics 108.

Section A.2 (below) will describe some of the ways in which the collection of topics 108 may be created. By way of overview, in one example, the discussion facilitating system 102 can organize topic-related items associated with a population of users into groups of related topic-related items. In one example, the topic-related items correspond to queries made by the population of users over a prescribed period of time. In this scenario, the discussion facilitating system 102 identifies groups of similar (or otherwise related) queries. The groups of queries, in turn, map to respective topics in the collection of topics 108.

The discussion facilitating system 102 can organize the subject matter in the collection of topics 108 based on any type of relationship among topics. In one example, the collection of topics 108 forms a hierarchy. In one example, the topics in the hierarchy can vary in specificity. For example, a topic associated with a root node of the hierarchy may represent a relatively encompassing subject, while the topics associated with the leaf nodes may represent relatively narrow subjects. In another case, the discussion facilitating system 102 can generate a non-hierarchical collection of topics; for instance, the collection of topics 108 may correspond to any type of directed or undirected graph, etc.

In any of the above examples, the collection of topics 108 may correspond to a single organization of topics. Alternatively, the collection of topics 108 may encompass multiple sub-collections of topics associated with different respective themes. Additional information regarding the possible arrangement of subject matter in the collection of topics 108 will be described below with reference to FIGS. 4 and 5 (which present examples of illustrative collections of topics).

The discussion facilitating system 102 can potentially provide an opportunity for the user to engage in a communication exchange relating to any topic (or topics) in the collection of topics 108. In the case of one type of hierarchical arrangement of topics, a communication exchange associated with an internal node may pertain to a broader (more encompassing) topic compared to a communication exchange associated with a leaf node. At any given time, any number of participants (including zero number of participants) may be engaging in a communication exchange associated with a particular topic in the collection of topics 108.

As will be described in Section A.3 (below), the discussion facilitating system 102 can select a topic (or topics) as a function of one or more factors. One factor corresponds to the extent to which the interest information (associated with the manifested interests of the user) matches the subject matter associated with each topic in the collection of topics 108. Another factor corresponds to the number of participants taking part in each communication exchange associated with each respective topic. Another factor (or series of factors) corresponds to identified characteristics of the participants associated with each communication exchange. Another factor corresponds to an identified intent of the user in conducting a search or performing some other behavior that leads to the presentation of a communication exchange. The discussion facilitating system 102 can rely on yet other factors and combination of factors in its selection of an appropriate topic or topics. The discussion facilitating system 102 can also omit one or more of the factors summarized above.

The communication system 104 implements the communication exchange (or plural communication exchanges) associated with the selected topic (or plural selected topics). In general, the term communication exchange encompasses any forum by which the user may carry on synchronous or asynchronous communication with one or more other participants using any mode of communication. In a chat-type communication exchange, a user may conduct a synchronous conversation with one or more other participants via a chat panel or the like. In an instant messenger-type exchange, a user may conduct a one-on-one or group-type synchronous conversation with people or entities identified in a contact list maintained by the user; thus, for the purposes of this description, an instant messenger-type exchange can be considered as a particular type of chat-type exchange. In a message board-type exchange, the user may communicate with other participants in an asynchronous manner, e.g., by posting messages to a hierarchical thread of messages or the like. In a voice-over-IP-type exchange (or like voice-related exchange), the user may communicate in real time with one or more other participants by spoken word. The communication system 104 may implement yet other forms of communication exchanges. Further, the communication system 104 can implement any hybrid-type combination of multiple communication exchanges. (To facilitate discussion, the examples which follow will emphasize the use of a chat-type communication exchange, although, as stated, the communication system 104 may implement any type of message exchange and any combination of different types of message exchanges.)

Section A.4 provides additional information regarding the communication system 104. In addition to exchanging messages among participants, the communication system 104 may perform other functions. For example, the communication system 104 may facilitate the sharing of information (such as identified search queries) among participants.

Advancing to FIG. 2, this figure shows one implementation of the system 100 of FIG. 1. In this example, the system 100 couples the discussion facilitating system 102 and the communication system 104 to end users via a network 202. In one case, the discussion facilitating system 102 and the communication system 104 can be implemented as two separate systems. In another case, the discussion facilitating system 102 and the communication system 104 can be implemented as a single system. In addition, the discussion facilitating system 102 and/or the communication system 104 can be integrated with the search engine 106 and/or some other system or combination of systems. The discussion facilitating system 102 and the communication system 104 can be administered by two respective entities or the same entity or combination of entities. The communication system 104 itself may represent a single system that hosts one or more communication exchanges. Or the communication system 104 may represent one or more subsystems that host different communication exchanges (as administered by a single entity or different respective entities).

The network 202 can represent a local area network, a wide area network (e.g., the Internet), or some combination thereof. The network 202 can be implemented by any combination of hardwired and/or wireless links, name servers, routers, gateways, etc., and may be governed by any protocol or combination of protocols.

The end users may communicate with the network 202 via local devices (204, 206, ... 208). The local devices (204, 206, ... 208) can correspond to any type of computing devices or combination of different types of computing devices. For example, a local device can correspond to a personal desktop computing device, a laptop computing device, a personal digital assistant (PDA) type computing device, a stylus-type computing device, a mobile phone type computing device, a game console device, a set-top box device, and so on.

A.2. Topic Creation Module

Figure 3:
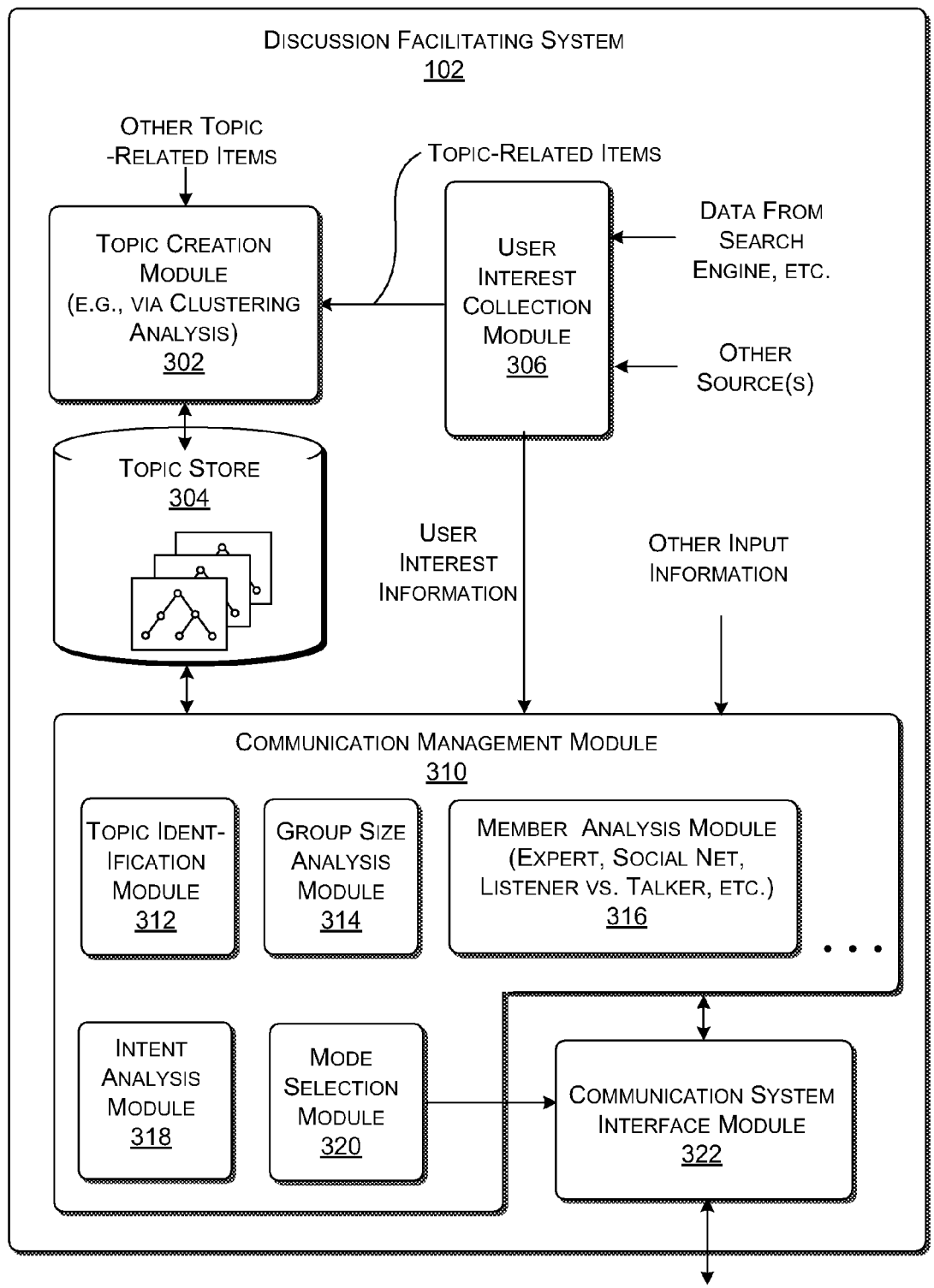
FIG. 3 shows an illustrative discussion facilitating system for use in the system of FIG. 1.

FIG. 3 shows additional detail regarding the discussion facilitating system 102. As one component, the discussion facilitating system 102 can include (or can be conceptualized to include) a topic creation module 302. The topic creation module 302 generates a collection of topics and stores the collection of topics in a topic store 304. To facilitate discussion, this section will first describe the operation of the topic creation module 302 in the context of the generation of a single-themed collection of topics. But the description also applies to the case in which multiple sub-collections of topics are generated. This section closes with an example of the generation of multiple sub-collections of topics.

The topic creation module 302 can form the topics in many different ways. In one illustrative case, the topic creation module 302 forms the topics by organizing so-called topic-related items into groups based on assessed similarity (or other type of relationship) among the topic-related items. In one case, for example, topic creation module 302 forms topics that reflect the interests of a population of users. To this end, the topic creation module 302 can receive interest information (where different pieces or parts of the interest information, in this context, constitute topic-related items). A user interest collection module 306 represents the component (or components) which perform the role of receiving any type of interest information from any source using any collection technique (e.g., push, pull, etc., or any combination thereof).

Various fields of information may be used to represent the interests of the population of users. For example, the user interest collection module 306 can receive search engine data, which may provide information regarding the queries that have been made by the population of users over a prescribed period of time. The search engine data may also provide information regarding the network resources (e.g., web sites and pages) that the users have visited. The user interest collection module 306 may also receive interest information from other sources, denoted generically in FIG. 3 as "other source(s)."

In one mode of operation, the operation of the topic creation module 302 can be divided, for explanation purposes, into two component operations. In one operation, the topic creation module 302 uses a technique (or combination of techniques) to assess the relationship among the topic-related items, such as the similarity between topic-related items. In another operation, the topic creation module 302 uses a grouping technique to organize the information items into groups based on the assessed relationship among topic-related items. These two component operations are used together to produce the collection of topics. The following description provides additional illustrative detail regarding these two illustrative operations; in the context of these examples, the illustrative relationship corresponds to assessed similarity among topic-related items.

As to the first operation, the topic creation module 302 can use various techniques (and various combinations of techniques) to assess the similarity among topic-related items. For example, assume that the topic-related items identify the queries made by the users. Further, assume that the topic-related items also (or alternatively) include information regarding the network resources (e.g., web sites and pages) that the users accessed in association with their search-related activity. In one case, for instance, the topic-related items may identify the network resources that the users have accessed in response to submitting particular queries. In other cases, the interest information may more generally identify the resource-accessing activity of users that is temporally correlated with the query-submission behavior of the users in any way; for example, the resource-accessing behavior need not follow the submission of queries, but may be more generally temporally correlated with the submission of the queries. The topic creation module 302 processes this type of interest information to identify similar user behavior.

In one illustrative approach, for example, the topic creation module 302 may assess the similarity between any two queries ($Q_A$ and $Q_B$) by examining the resources that were accessed following the submission of the two queries. For example, the similarity between $Q_A$ and $Q_B$ can be computed by using a cosine similarity technique, as follows:

$$\text{Similarity}(Q_A, Q_B) = \frac{\sum_i P(u_i|Q_A)P(u_i|Q_B)}{\sqrt{\sum_i P(u_i|Q_A)^2 \sum_i P(u_i|Q_B)^2}}$$

Here, $P(u_i|Q_A)$ refers to the probability that a user will click on resource $u_i$ after inputting query $Q_A$, while $P(u_i|Q_B)$ refers to the probability that a user will click on resource $u_i$ after inputting query $Q_B$. Such an approach determines that query $Q_A$ is similar to query $Q_B$ if these queries resulted in accessing many of the same resources. Other approaches can be used to assess the similarity between queries, such as a Kullback-Leibler (KL) divergence technique.

In another technique, the topic creation module 302 determines the similarity between any two queries ($Q_A$ and $Q_B$) based on the similarity in search results returned for the two queries (without regard to the users' access-related behavior upon receiving the search results). For example, two lists of search results can be compared with reference to the identities of the resources that appear in the lists. In addition, or alternatively, two lists of search results can be compared with reference to text snippets that appear in the lists. For example, query $Q_A$ may be considered to be similar to query $Q_B$ if these two queries generate search results that have many words in common.

In another technique, the topic creation module 302 determines the similarity between any two queries ($Q_A$ and $Q_B$) based on an assessed linguistic similarity between the two queries. For example, query $Q_A$ may be considered to be similar to query $Q_B$ if these two queries have one or more query terms in common.

In another technique, the topic creation module 302 determines the similarity between any two queries ($Q_A$ and $Q_B$) based on whether these queries may have occurred close together in time. For example, two queries made by a user within a single search session may be related.

The above techniques are representative of many ways that similarity among topic-related items can be assessed. Further, as mentioned above, the topic creation module 302 can use a combination of techniques to assess similarity. For example, in a first stage, the topic creation module 302 can use the cosine similarity among topic-related items to assess the similarity among items. This will yield a first set of groups of items. In a next stage, the topic creation module 302 can further organize the topic-related items based on a linguistic technique, e.g., based on the words used in the queries themselves, and so on.

As to the second component of the operation, the topic creation module 302 can use various types of algorithms to organize the topic-related items into groups. One such general technique is agglomerative clustering. In this technique, the topic creation module 302 can identify a first set of relatively small clusters based on any measure of similarity among the topic-related items. In a next stage, the topic creation module 302 can group together those smaller clusters into larger clusters. This process can be repeated any number of times. One technique for forming clusters is centroid clustering. In this technique, a most popular query can define the centroid of a cluster. As mentioned above, the topic creation module 302 can also use different techniques for assessing similarity for different respective stages of the clustering operation.

As described in Section A.1, different topics may correspond to different subject matter-related targets for discussion. For example, a topic for dogs accommodates a discussion about dogs. In addition, or alternatively, the topic creation module 302 can use other considerations to define topics. For example, without limitation, the topic creation module 302 can define topics based on temporal considerations, location-based considerations, popularity-based considerations, and so on, or any combination thereof. For example, the topic creation module 302 can identify a topic for "hot issues," which accommodates a potpourri of communication exchanges about popular issues, even though the discussions may otherwise have no nexus in terms of subject matter.

Further, in the above examples, the topic-related items reflect the interests of a population of users, e.g., as exhibited by the network-related behavior of the users. In addition, or alternatively, the topic creation module 302 can form topics based on other kinds of topic-related items that may not reflect the interests of users. For example, the topic creation module 302 can receive information regarding words which appear in network-accessible pages or other content. In this context, two pieces of information can be assessed as related if they appear in the same page (or otherwise are considered to appear together based on any prescribed criterion or criteria). FIG. 3 illustrates the use of alternative types of topic-related items by showing another input arrow pointing to the topic creation module 302.

In another illustrative case, the topic creation module 302 can form topics by making reference to any type of previously created collection of topics (potentially created by an external third party entity). For example, the topic creation module 302 can form topics by making reference to a collection of topics identified by the Wikipedia resource or like resource or other external provider of topic information (e.g., the Open Directory Project).

In another illustrative case, the topic creation module 302 can form topics by providing an interface which allows an administrator to create topics in a fully manual manner. Alternatively, or in addition, the topic creation module 302 can form topics by providing an interface which allows an administrator to modify automatically-identified topics. Alternatively, or in addition, the topic creation module 302 can form topics based on the collective feedback provided by a plurality of users. For instance, the topic creation module 302 can identify topics based on any type of social cooperative application, such as an accumulative tagging application or the like.

In another illustrative case, the topic creation module 302 can form topics using any type of tool or combination of tools (based on any type of topic-related items that may or may not reflect the interests of users). For example, the topic creation module 302 can use a machine learning tool, a neural network tool, a rules-based system tool, etc.

The topic creation module 302 can form topics in yet other ways or combination of ways.

The result of the processing performed by the topic creation module 302 is a collection of topics, which, as stated above, may include multiple sub-collections of topics. The topics can be structured based on any type of relationship or combination of relationships. In one case, for example, the collection of topics may be conceptualized as a graph of topics, where each node in the graph represents a topic. Such a graph may form a directed or undirected collection of nodes. In one case, the collection of topics may have a hierarchical or non-hierarchical arrangement of topics.

Consider, for instance, the case in which the topics have a hierarchical relationship. As explained above, for example, a clustering algorithm may merge relatively small clusters into larger clusters. The relationship among these clusters of different sizes defines a hierarchical structure of topics having different levels of generality. More specifically, such a hierarchy of topics may be conceptualized as a tree of topics, with the root node of the tree corresponding to a relatively general topic, and the leaf nodes of the tree corresponding to relatively specific topics. Intermediary nodes in the tree define topics of intermediate levels of generality. Further, as mentioned above, the collection of topics may include a plurality of sub-collection of topics pertaining to different respective themes. Each sub-collection of topics, in turn, may correspond to a hierarchy of concepts.

In the above example, the factor which organizes the topics corresponds to the level of generality (or specificity) associated with the topics. But the topic creation module 302 can use any consideration or combination of considerations to structure the topics. For example, the topic creation module 302 can organize the topics into different categories based on a semantic consideration (which need not take the form of a hierarchy of concepts), a temporal consideration, a location-based consideration (based on geographic location or other spatial consideration), a popularity-based consideration, and so on. Alternatively, the topic creation module can create a collection of topics that has no organizational structure or an ad hoc or loosely-enforced type of organizational structure.

Figure 4:
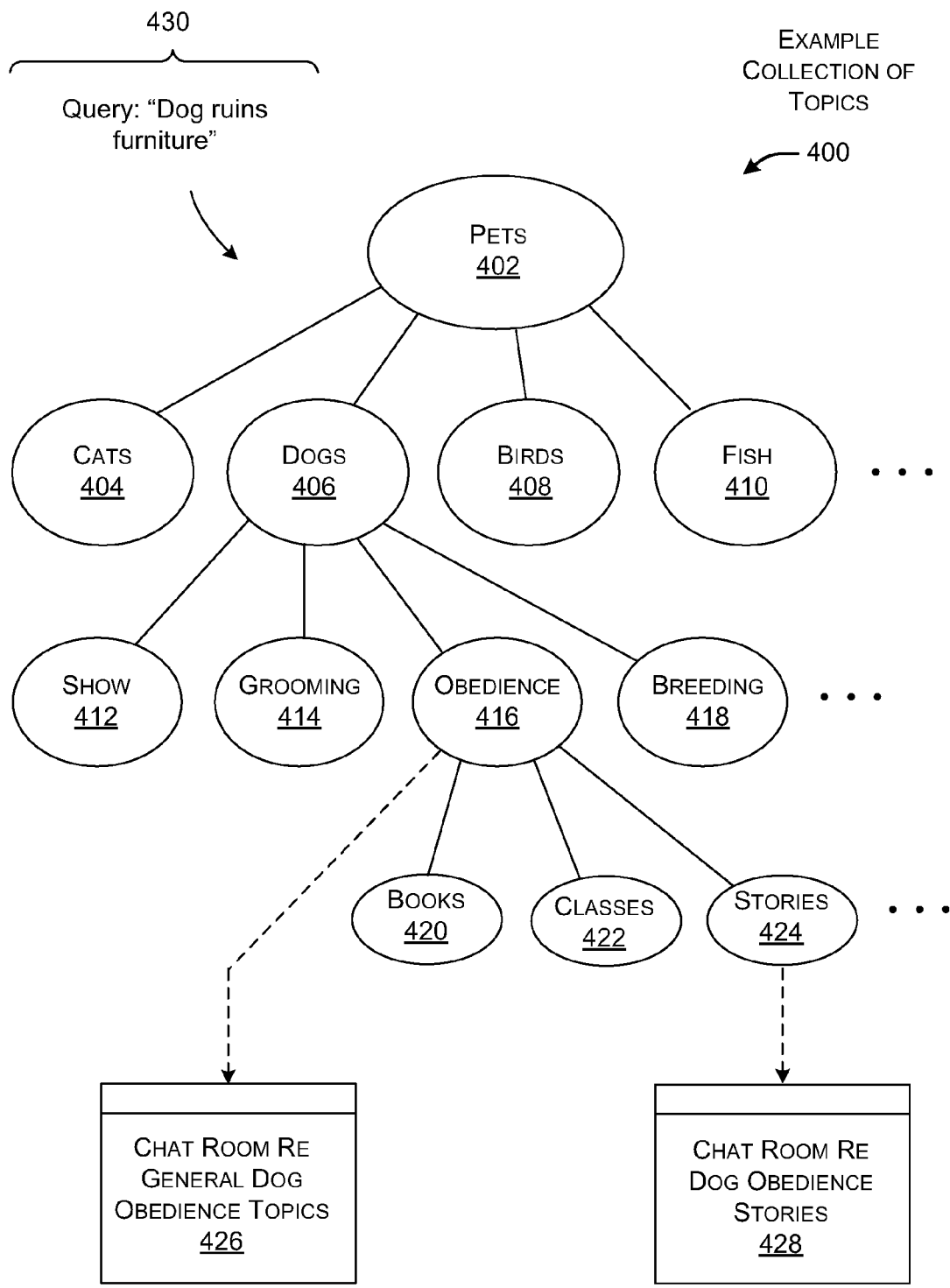
FIG. 4 shows an example of a collection of topics that can be created using the discussion facilitating system of FIG. 1.

Jumping ahead momentarily in the sequence of figures, FIG. 4 shows an illustrative example of a collection of topics 400 having a hierarchical structure. The collection of topics 400 pertains to the theme of pets. The root node 402 pertains to the general category of pets. The next tier of nodes (404, 406, 408, 410) pertains to different topics relating to different types of pets. The next tier of nodes (412, 414, 416, 418) pertains to different topics relating to dogs. The next tier of nodes (420, 422, 424) pertains to different topics relating to dog obedience.

The topic creation module 302 can associate each node in the collection of topics 400 with one or more communication exchanges, such as, but not limited to, chat-type exchanges. Each chat-type exchange may host a chat room, which metaphorically defines a forum in which any number of people can communicate with each other, e.g., by exchanging text messages or the like via a chat panel presented on a user interface presentation. Thus, for instance, the topic creation module 302 can associate a first chat room 426 (or other type of communication exchange) with the general topic of dog obedience (associated with node 416). That is, the chat room 426 can host a discussion among people who want to address any issue relating to the obedience of dogs. The topic creation module 302 can associate a second chat room 428 (or other type of communication exchange) with the more specific subject of dog obedience stories (associated with node 424). That is, the chat room 428 can host a discussion among people who simply wish to convey their experiences with dog obedience issues, e.g., rather than ask or answer directed questions.

Figure 5:
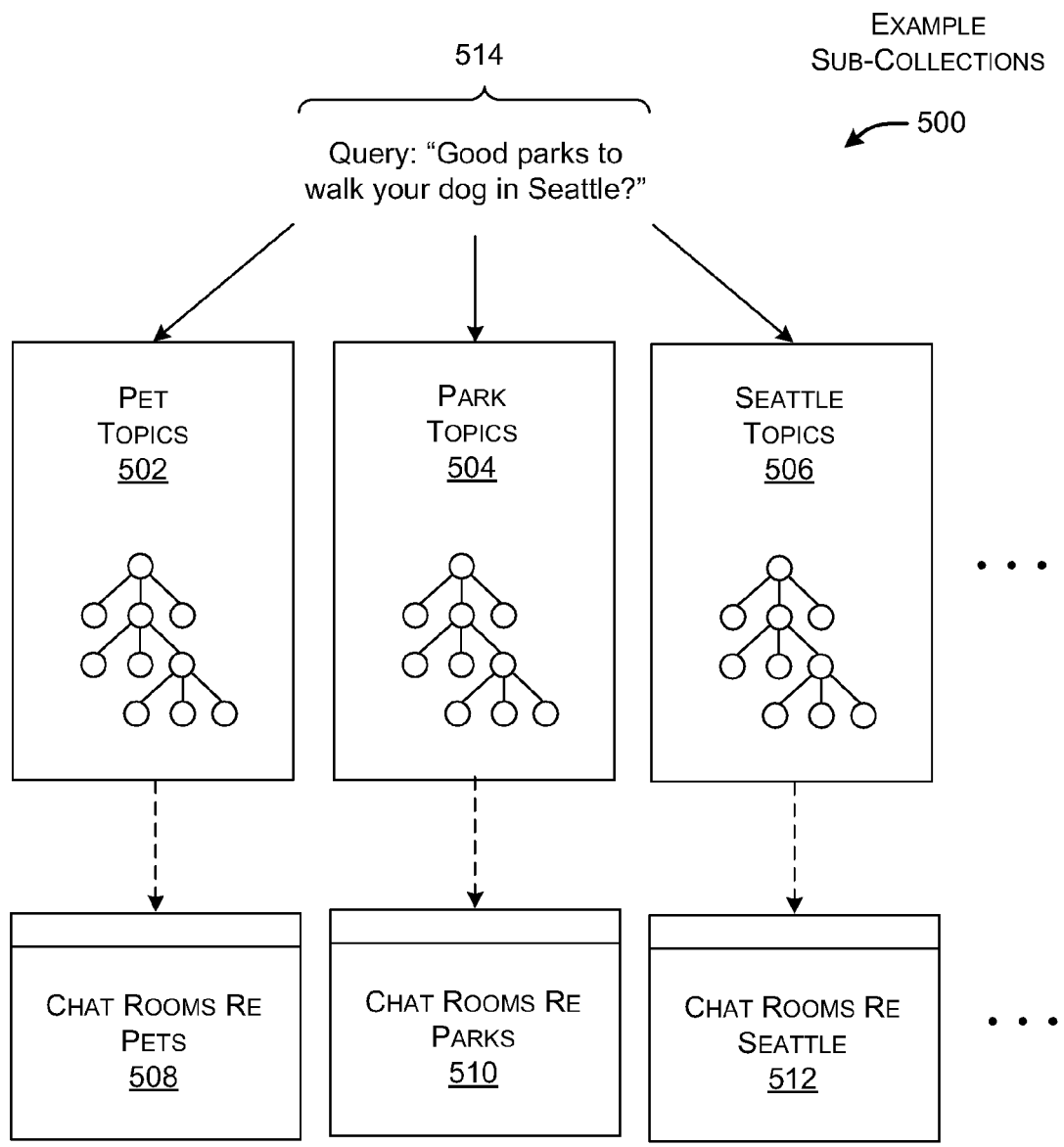
FIG. 5 shows an example of multiple sub-collections of topics that can be created using the discussion facilitating system of FIG. 1.

FIG. 5 shows an illustrative example in which the topic creation module 302 creates multiple sub-collections of topics pertaining to different respective themes. A first sub-collection of topics 502 may pertain to the theme of pets. That sub-collection of topics 502 may correspond to the collection of topics 400 shown in FIG. 4. A second sub-collection of topics 504 may pertain to the theme of parks. A third sub-collection of topics 506 may pertain to the theme of Seattle. A first series of chat rooms 508 (or other types of communication exchanges) may be associated with the first sub-collection of topics 502. A second series of chat rooms 510 (or other types of communication exchanges) may be associated with the second sub-collection of topics 504. A third series of chat rooms 512 (or other types of communication exchanges) may be associated with the third sub-collection of topics 506. The topic creation module 302 can create the sub-collection of topics using any type of approach described above or a combination of different types of approaches. For example, the topic creation module 302 can, in one example, create each different sub-collection of topics using a different approach.

The topic creation module 302 can create the above-described types of collections based on any type of timing consideration. In one case, the topic creation module 302 can perform its processing on any periodic basis (e.g., once a minute, once a day, once a week, once a month, etc.). In addition, or alternatively, the topic creation module 302 can trigger its processing based on the amount of data it collects and/or the nature of the data it collects.

Further, the topic creation module 302 can dynamically create topics to accommodate people who wish to discuss topics associated with rapidly evolving subject matter (as in the case with news events and the like). This functionality can be implemented in various ways. In one technique, the topic creation module 302 can perform its analysis of topic-related items (e.g., queries, etc.) on a relatively frequent basis. Thus, for example, assume that there is a news event of great interest that has just happened. A user may engage in a search session aimed at investigating this event. In the course of the session, the topic creation module 302 may simultaneously detect other users' interest in the same news event. In response, the topic creation module 302 can define another topic in the collection of topics that is directed to the news event. The topic creation module 302 can perform any type of analysis described above in creating the additional topic (e.g., by examining the content of queries, the identity of search results, the identity of accessed resources, and so on). As a result of this analysis, a user may be invited to participate in a communication exchange in the middle of her search session that did not exist at the beginning of her search session.

In the above example, the topic creation module 302 creates new topics in response to a determination that many people appear to manifesting a spike of interest in the same topic. This mode of analysis is global in the sense that it is triggered by trends exhibited by a population of users. Alternatively, or in addition, the topic creation module 302 can adopt an approach that is more oriented towards the behavior of each individual user. For example, the topic creation module 302 can examine topic-related items regarding a particular user's current interaction with a network environment (e.g., as manifested by the user's queries, accessed resources, and so forth). Based on this triggering observation, the topic creation module 302 can perform an investigation to determine whether one or more other people are exhibiting interest in the same topic, as reflected by interest information. Again, the topic creation module 302 can perform any type of analysis described above in determining the relatedness among the interests of different users. If the topic creation module 302 determines that there is a suitable match among two or more users, it may propose a communication exchange which addresses the common topic.

Still other approaches can be used to establish topics in a substantially dynamic manner. Moreover, as noted above, the topics can be established with reference to external sources; such sources may or may not reflect user interests. For example, the topic creation module 302 may receive newsfeed information (or the like) that identifies current news stories. The topic creation module 302 can create new topics in dynamic fashion based on this source of subject matter.

In one approach, the topic creation module 302 can integrate the newly created topics into a collection of topics that already exists. For example, consider the illustrative case in which a collection of topics is devoted to a popular movie actress. The collection of topics may already host a number of different topics regarding many aspects of the actress's career and personal life. Then suppose that the actress becomes embroiled in an issue of great interest to her fans, e.g., regarding her marriage. In this case, the topic creation module 302 can detect this surge of interest (in any manner described above, for instance), and create a new topic that represents a leaf node of a hierarchical tree of topics (presuming that the topics are arranged in this fashion). For example, if one branch of the tree concerns the actress's relationship with her husband, then the new topic might be added as a leaf node on this branch. Again, any of the analyses described above in the context of the creation of a collection of topics can be used to govern the addition of a new topic to an existing collection of topics.

In other cases, the topic creation module 302 (in cooperation with a communication management module 310 described more fully below) may create new topics in the course of managing ongoing discussion with existing exchanges. For example, the communication management module 310 may determine that too many people are joining a communication exchange associated with a particular topic. In response, the topic creation module 302 can break apart this topic into parallel sister topics that address the same theme. Alternatively, these sister topics can be distinguished by supplemental attributes, such as the geographical origin of people taking part in the discussion.

In another case, the communication management module 310 can determine that the conversation that is taking place with respect to a general topic appears to address a sub-topic. The communication management module 310 can make this determination, in one case, by analyzing text being exchanged in the main conversation, e.g., by identifying common keywords that appear to relate to the sub-topic. In response, the topic creation module 302 can add a new topic that represents a child node with respect to the topic node of the main conversation (in the case in which a hierarchical organization is used).

Still other ways of evolving and expanding an existing collection of topics are possible. In addition, the topic creation module 302 can remove (e.g., prune) one or more of the topics that have been created. The topic creation module 302 can perform this operation in response to an assessment that these topics are stale, meaning that they no longer elicit interest among users.

In another implementation, the topic creation module 302 can create topics that are not associated with (e.g., not linked to) any collection of topics. In this implementation, the topic creation module 302 can retire any topic upon the conclusion of any communication exchange associated with the topic. Or the topic creation module 302 can persist any topic that has been created within an ad hoc and unstructured collection of such topics.

A.3. Communication Management Module

Returning to FIG. 3, the discussion facilitating system 102 also can include (or can be conceptualized to include) a communication management module 310. The communication management module 310 operates to determine one or more topics in the collection of topics (generated by the topic creation module 302) that may be appropriate for the user based on the user's presumed interests. The communication management module 310 may then suggest one or more communication exchanges that address the identified topics. (Note that, to facilitate explanation, the communication management module 310 is described as matching the current interests of the user with appropriate topics, but the communication management module 310 can also base its matching analysis on the prior assessed interests of the user and/or the future projected interests of the user.)

As described above when discussing FIG. 1, the interests of a user are represented by user interest information associated with the user. The interest information, in turn, can have multiple components. As one component, the interest information may reflect the network-related behavior of the user. In one case, this corresponds to one or more queries that the user has recently submitted to the search engine 106. In addition, or alternatively, the interest information may correspond to the network resources (e.g., web sites) that the user has accessed, e.g., in response to submitting particular queries other otherwise. In addition, or alternatively, the interest information may reflect the non-behavioral characteristics of the user (e.g., the geographic location of the user, the gender of the user, the age of the user, etc.), and so on. No limitation is placed on what type of information may used to represent the interests of a user at a particular point in time. The discussion facilitating system 102 can also associate a particular user with a class of users who share similar characteristics. The discussion facilitating system 102 can then examine the general behavior and characteristics of that class of users as a proxy in representing the likely interests of the particular user.

The communication management module 310 can include (or can be conceptualized to include) different component modules. Each of these component modules performs a different type of analysis that has a bearing on the determination of whether a topic (and associated communication exchange) is appropriate for a particular person at a particular point in time. The communication management module 310 can rely on any one of these component modules or any combination of these component modules in making its ultimate decision to associate a user with a particular topic (or topics). The analysis performed by the component modules may be interrelated; for instance, one component module may rely on the analysis performed by another component module.

Any of the component modules of the communication management module 310 may operate on the interest information, among other information, in an attempt to find a suitable topic or topics. In other words, the processing of interest information may be distributed throughout the communication management module 310.

A first component module is a topic identification module 312. The topic identification module 312 attempts to match the interest information (associated with a particular user) with one or more topics in the collection of topics. By virtue of being associated with such topics, the user is presumed to manifest an interest in these topics. In other words, classification of a user into a particular topic is tantamount to an assessment that the user has an interest in that topic. In one example, to perform its matching operation, the topic identification module 312 determines the similarity (or relatedness) between the interest information and the subject matter associated with each topic in the collection of topics. To perform this operation, in turn, the topic identification module 312 can rely on any technique or combination of techniques used by the topic creation module 302 to initially create the collection of topics.

For example, assume that the interest information primarily corresponds to the current query that the user has submitted to the search engine 106. In response to this query, the search engine 106 may have returned a set of results, upon which the user may have accessed one or more of the resources identified in the results. In this case, the topic identification module 312 can determine the linguistic similarity between the current query and the queries associated with each topic. Alternatively, or in addition, the topic identification module 312 can determine the extent of any overlap between the search results associated with the current query and the typical search results associated with each topic. Alternatively, or in addition, the topic identification module 312 can determine the extent of any overlap between the accessed resources associated with the current query and the typical accessed resources associated with each topic. Still additional ways of determining the similarity between the interest information and the topics in the collection of topics are possible. More generally, the topic identification module 312 can use any criterion (or criteria) of relatedness in associating the interest information with one or more topics. The factors used to assess such relatedness may include semantic considerations, linguistic considerations, temporal considerations, location-based considerations, popularity-based consideration, etc., or any combinations thereof.

The process of matching the interest information with topics in a collection of topics can be implemented in different ways, e.g., depending on the structure of the collection of topics. In the case of a graph of connected nodes, for instance, the process of matching can take the form of searching the graph for an appropriate topic or topics.

Jumping ahead momentarily in the sequence of figures, FIG. 4 shows a representative example in which the user has entered the query 430 "Dog ruins furniture." In this case, the topic identification module 312 may associate the user with the general topic of dog obedience node 416, along with corresponding chat room 426. This is because the user's query contains words "dog" and "ruins furniture" which are semantically indicative of the user's presumed interest in the general topic of pet obedience. In addition, or alternatively, the topic identification module 312 can examine the network resources (e.g., web sites) that the user may have accessed after entering the query 430 to refine its analysis.

In addition, or alternatively, the topic identification module 312 can associate the user with the more specific topic pertaining to dog obedience stories, as per node 424, along with the associated chat room 428. In this case, the topic identification module 312 may make the assessment, based on analysis of the interest information, that the user simply wishes to discuss her pet-related problem with other pet owners, rather than address a specific question relating to this problem. As will be described below, the communication management module 310 can employ additional tools to assess the intent of the user.

Although not shown, the collection of topics 400 may host a topic relating to the specific query 430 entered by the user, or a normalized (e.g., generalized) version thereof. In another case, rather than matching the user's query with a pre-existing query in the collection of topics 400, the topic creation module 302 can dynamically create a new topic associated with the query 430 that the user has entered in the manner described in Section A.2. This might be a useful option in the case in which a significant number of users appear to be expressing current interest in a particular topic, such as a current news event.

It may be appropriate to simultaneously associate the user with multiple topics and associated chat rooms. In the case of FIG. 4, it may be somewhat ambiguous whether the user simply wishes to share stories with others about the topic of dog obedience or actively solve her dog-related problems. In this case, the topic identification module 312 can simultaneously associate the user with the more general category of dog obedience and the more specific category of dog obedience stories.

FIG. 5 illustrates another scenario in which it may be appropriate to associate the user with multiple topics and associated chat rooms. In this case, presume that the user enters the query 514 "Good parks to walk your dog in Seattle?" Presumably, the user is interested in locating information regarding suitable parks to walk her dog in the city of Seattle. In this case, the user's presumed interest has some bearing on the themes of pets, parks, and Seattle. Thus, the topic identification module 312 can simultaneously associate the user with one or more topics (and corresponding chat rooms) in the pet-related sub-collection of topics 502, one or more topics (and corresponding chat rooms) in the parks-related sub-collection of topics 504, and one or more topics (and corresponding chat rooms) in the Seattle-related sub-collection of topics 506.

In the case in which plural sub-collections are provided, the topic identification module 312 can use any consideration to determine one or more sub-collections that are appropriate. For example, the topic identification module 312 can score the suitability of the leaf nodes of different sub-collections (based on any analyses described above) and then select the sub-collection that yields the highest score(s). In addition, or alternatively, the topic identification module 312 can rely on a rules-based framework in assessing the suitability of a sub-collection of topics.

In addition, or alternatively, the communication management module 310 can allow a user to store preferences pertaining to topics. In this case, the topic identification module 312 can access the pre-stored preferences of a particular user in deciding the appropriateness of a topic for that user. For example, the user may have previously indicated that he or she is particularly interested in dog grooming. The topic identification module 312 can use this information to bias its analysis in any way, particularly in those cases in which there is ambiguity regarding the appropriate classification of a user's current search-related behavior.

Returning to FIG. 3, the communication management module 310 may also include a group size analysis module 314. The group size analysis module 314 performs analysis on the number of participants associated with each topic (or projected to be associated with each topic) in deciding what topics are appropriate for a particular user.

In some cases, the group size analysis module 314 may attempt to place the user into a topic that does not have too many participants. This is because the user may find that an over-crowded chat room is too complex and confusing. In addition, or alternatively, the group size analysis module 314 may attempt to avoid placing the user into a topic that has too few participants. This is because the user may find that a sparsely-populated communication exchange is too boring or uninformative.

In one case, the group size analysis module 314 can rely on predetermined rules to make a determination of whether a communication exchange is too crowded or too sparsely populated. The group size analysis module 314 can qualify these rules based on the subject matter being addressed and any other factor or combination of factors. In another scenario, the communication management module 310 may decide to simultaneously place the user in two or more topics and associated communication exchanges, one of which may have a larger number of participants than another. This provision gives the user the ongoing option of participating in the larger chat room or the smaller chat room. Or the user may very well decide to interact with both, realizing that each communication exchange has respective advantages and disadvantages.

The group size analysis module 314 also bases its analysis on the type of communication exchange being considered. In the case of a chat room environment, the number of participants in the chat room is a factor that contributes to the desirability of the chat room. In a message board environment, the number of participants has a reduced level of importance, or no importance.

In addition, or alternatively, the group size analysis module 314 can allow a user to specify size-related preferences. The group size analysis module 314 can then consult these preferences in determining the appropriateness of a communication exchange for a particular user. For example, the user may have previously indicated that he or she is interested communication exchanges that have, on average, a certain number of participants; the group size analysis module 314 can use this information to influence its analysis in any way.

The communication management module 310 may also include a member analysis module 316. The member analysis module 316 can perform a wide range of analyses to determine whether there is a good match between the user and the individuals within a particular communication exchange being considered. In other words, the member analysis module 316 examines various considerations to determine whether the user "fits in" with a group of people discussing a particular topic.

In one case, the member analysis module 316 examines one or more social networks associated with the user to identify individuals with whom the user is already affiliated. The member analysis module 316 can then use this information to bias its decision regarding its selection of topics and associated communication exchanges. For example, the member analysis module 316 can favor (or disfavor) those communication exchanges that include participants with whom the user has some prior relationship. The member analysis module 316 can mine various type of contact information in performing its analysis, such as information regarding the user's instant messenger contacts, information regarding the user's Email contacts, information regarding the user's social networking service contacts, and so on. The last-mentioned source of contact information can readily yield information regarding the degree of relationship between the user and another participant (e.g., indicating whether a participant is a direct friend of the user, a friend-of-a-friend, and so on).

The member analysis module 316 can examine other characteristics of users in an attempt to find a communication exchange that will produce a fruitful discussion. For example, the member analysis module 316 may attempt to join together users who share a similar profession, geographic location, gender, age group, and so on.

Further, the member analysis module 316 can select a communication exchange based on an expertise level of the user in conjunction with the expertise levels of existing (or proposed candidate) participants of the exchange. In one case, for instance, the member analysis module 316 can add a novice user to a discussion that contains at least one expert regarding the subject being discussed. The presumption here is that the novice user may benefit from the advice of the expert participant. In another case, the member analysis module 316 can combine a user with other participants who have similar expertise regarding a particular subject. The presumption here is that the user may simply wish to converse with others who have similar experiences. Still other expert-related considerations may play a part in associating a user with a particular communication exchange.

In another case, the member analysis module 316 takes in consideration the extent to which a user typically takes part in a discussion. Some users generally prefer to read (or listen to) the messages of other users. Other users generally prefer to take an active role in adding content to a communication exchange. The member analysis module 316 can use this insight to promote constructive discussions. For example, the member analysis module 316 may attempt to avoid adding a taciturn user to a chat room with other taciturn users (as this might result in a weak discussion). In addition to assessing the general proclivity of users to talk (or listen), the member analysis module 316 can determine the actual activity levels of discussions occurring within the communication exchanges.

As in the case of other component modules, the member analysis module 316 can consult the pre-stored preferences of the user (if such information exists). For example, the user may have previously indicated that he or she wishes to be joined with users having particular characteristics (e.g., age, experience level, gender, talkativeness, and so on). The user may also specifically identify those participants with whom he or she prefers to communicate, or prefers not to communicate (e.g., as in the case of spammer-like participants or abusive participants, etc.). The member analysis module 316 can use this preference information to influence its analysis in any way.

In addition, or alternatively, the member analysis module 316 can determine the characteristics of a user based on feedback supplied by other users. For example, the member analysis module 316 can determine the expertise level of a user based on rating information supplied by other users. For example, a user who is satisfied with the answer given by a particular participant of a chat room may given a high rating to that participant (e.g., through a rating-type interface associated with the chat room). In the future, the member analysis module 316 can use this information as one factor in determining how this participant can be constructively used to facilitate discussions. The member analysis module 316 can also automatically deduce the likely expertise of a user based on his or her behavior in interacting with communication exchanges, such as by noting how many questions that the user has answered. The member analysis module 316 can also assess the expertise of a user by examining the user's pre-chat search interactions, in-chat discussions, etc. (e.g., so as to identify the technicality of the user's query vocabulary).

The member analysis module 316 can rely on yet other factors to determine whether a user "fits in" with a group of people associated with a particular topic.

The communication management module 310 may also include an intent analysis module 318. The intent of the user refers to the presumed objective that the user is attempting to accomplish in performing a search (or the like). The intent analysis module 318 can perform various analyses to determine the intent of the user at a particular point in time. For example, the intent analysis module 318 can determine whether a user who has submitted a query is primarily interested in finding an answer to a specific question, or whether the user generally wishes to converse with others regarding a particular topic (without addressing any particular question). The intent analysis module 318 can examine the query itself to make this decision, as well as other network behavior associated with the query (such as an indication of the network resources that the user has accessed in temporal association with entering a query). For example, the query 430 "Dog ruins furniture" of FIG. 4 appears to take the form of a statement, perhaps indicating that the user wishes to merely chat with others regarding a dog-related topic. In contrast, the query 514 "Good parks to walk your dog in Seattle?" appears to take the form of a directed inquiry, indicating that the user wishes to address a narrow question. The intent of the user may be conceptually regarded as the goal-directed component of the user's interests. For example, a user may be interested in the topic of dogs; the intent component of this interest specifically establishes that she wants to address a certain problem with respect to this topic.

In addition, or alternatively, the intent analysis module 318 can consider the pre-stored preferences of the user (if they exist) in deciding the intent of the user. For instance, a user may pre-designate that he or she typically uses a search engine to answer specific questions.

The communication management module 310 may also include a mode selection module 320. The mode selection module 320 performs analysis to determine the type of communication exchange that is most appropriate for a particular topic. The mode selection module 320 can perform this analysis based on any type of factor or combination of factors. For example, the mode selection module 320 can examine the query itself (and related behavior) to determine the appropriateness of a particular type of communication exchange. To this end, the mode selection module 320 can interact with the intent analysis module 318 and/or other component modules in the communication management module 310. For example, the mode selection module 320 can conclude that a query seems to evince a general proclivity to talk about a particular subject (as in "What about that U2 concert last night?"), and thus direct the user to a real-time chat-type exchange. In another case, the mode selection module 320 can determine that a query seems to be asking a specific question (e.g., as in "What time does the U2 concert begin tonight?"), and thus directs the user to a message board-type exchange or the like. In some cases, more than one type of exchange may be appropriate to address the particular needs of the user, or the user's needs remain somewhat ambiguous. In this situation, the mode selection module 320 can invite the user to participate in different types of exchanges. The user may respond by engaging in different types of exchanges at the same time.

The above-identified component modules within the communication management module 310 are illustrative and non-limiting. Other implementations of the communication management module 310 can include additional component modules, and/or can omit one or more component modules shown in FIG. 3.

To facilitate various types of analyses described above, the communication management module 310 can store profiles associated with each user. The profiles may describe various preferences and characteristics associated with each user. The information provided by a profile may be obtained from one or more sources. For example, a profile for a user may include information that identifies the behavior of the user, information obtained from one or more public sources, information supplied by the user himself or herself, information supplied by other users (as in the case of rating information), and so on. As described above, various safeguards can be used to ensure the security of personal data.

The communication management module 310 can combine the analyses of its component modules in various ways. In one approach, for instance, the communication management module 310 can attach different weights to the conclusions reached by the analyses performed by the component modules; the appropriateness of any topic may be reflected a weighted sum of the conclusions reached by the component analyses. More generally, the communication management module 310 can use any of a rules-based system, artificial intelligence system, neural network system, statistical analysis system, etc., in combining the results of its component modules.

As described above, in one implementation of the communication management module 310, the processing of interest information may be distributed among any number of component modules. In another implementation, the discussion facilitating module 102 can provide one or more modules (not shown) that are dedicated to the task of performing analysis to determine the presumed interests of the user. The component modules of the communication management module 310 can rely on such preliminary analysis in performing their own respective analyses.

For that matter, the user interest information that is received by the discussion facilitating module 102 can include information that reflects previously performed analyses regarding user interests, performed by one or more external modules (not shown). Any information fed to the discussion facilitating module 102 may be regarded as interest information, regardless of whether it is raw "unprocessed" data or processed data that is reflective of previous analysis.

As a remaining topic, the communication management module 310, in potential cooperation with the topic creation module 302, also plays a role in managing the user's affiliation with topics throughout the user's interaction with the discussion facilitating system 102. For example, in the course of interacting with one communication exchange, the communication management module 310 can invite the user to join another communication exchange. The newly proposed communication exchange can supplement the communication exchange that the user is already taking part in, such that the user will be taking part in two or more communication exchanges upon joining the new communication exchange. Alternatively, the newly proposed communication exchange can substitute the communication exchange that the user is currently taking part in.

Any factor or combination of factors can prompt the communication management module 310 to propose a new topic (and/or abandon an existing topic). For example, the group size analysis module 314 may make a determination that a communication exchange is growing too large and unwieldy, and thus ask one or more users whether they wish to join another communication exchange. The new communication exchange may address the same issue that is being discussed in the former communication exchange, or it may address a more specific topic (that may involve fewer participants). In addition or alternatively, the topic identification module 312 may make a determination that a topic of an existing communication exchange is straying from the initially-assessed or presently-assessed interests of a user. The topic identification module 312 may thus ask this user whether he or she wishes to join another communication exchange that is more aligned with the user's interests. Still other considerations can be used to influence the migration of a user from one communication exchange to another. In general, the analysis performed by any component module within the communication management module 310 can play a part in influencing the transition of users between communication exchanges as the users interact with the discussion facilitating system 102.

As indicated above, the communication management module 310 can expressly invite the user to join another topic and associated communication exchange. Or the communication management module 310 can automatically add the user to the other communication exchange. In addition, the user can, at any time, through any kind of interface, independently investigate available topics and associated communication exchanges and then manually select a topic and associated communication exchange which matches the user's interest.

The discussion facilitating system 102 also includes a communication system interface module 322. As the name suggests, the communication system interface module 322 couples the discussion facilitating system 102 with the communication system 104 that implements the selected communication exchange or exchanges. As described above, in one case, the discussion facilitating system 102 is separate from the communication system 104, such that the interaction performed by the communication system interface module 322 carries out a flow of information and instructions between two distinct systems. In another case, the discussion facilitating system 102 is integrated with the communication system 104, such that the communication system interface module 322 conceptually indicates the coupling of the functions performed by the discussion facilitating system 102 with the functions performed by the communication system 104.

A.4. Communication System

Figure 6:
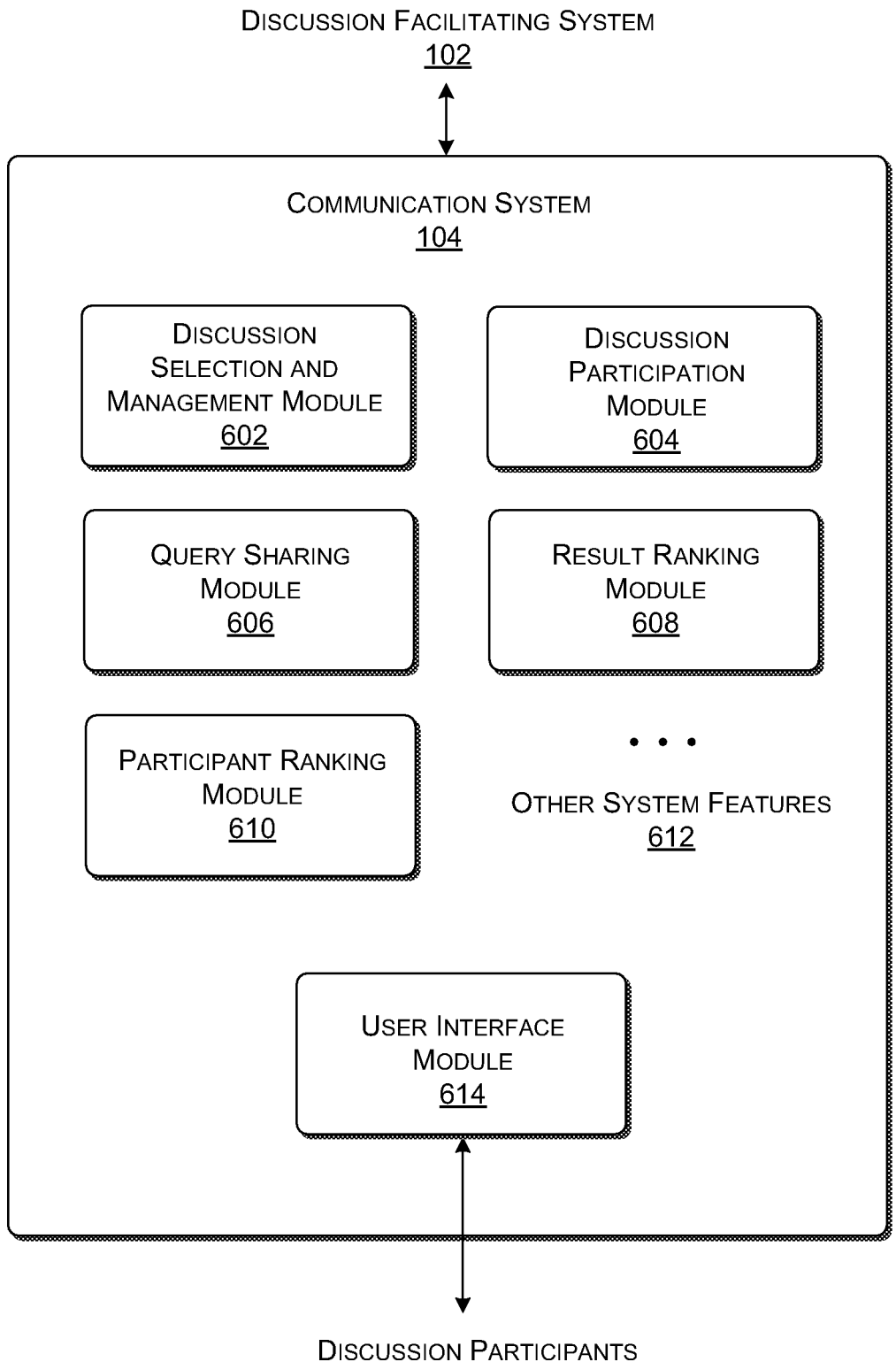
FIG. 6 shows an illustrative communication system for use in the system of FIG. 1.
Figure 7:
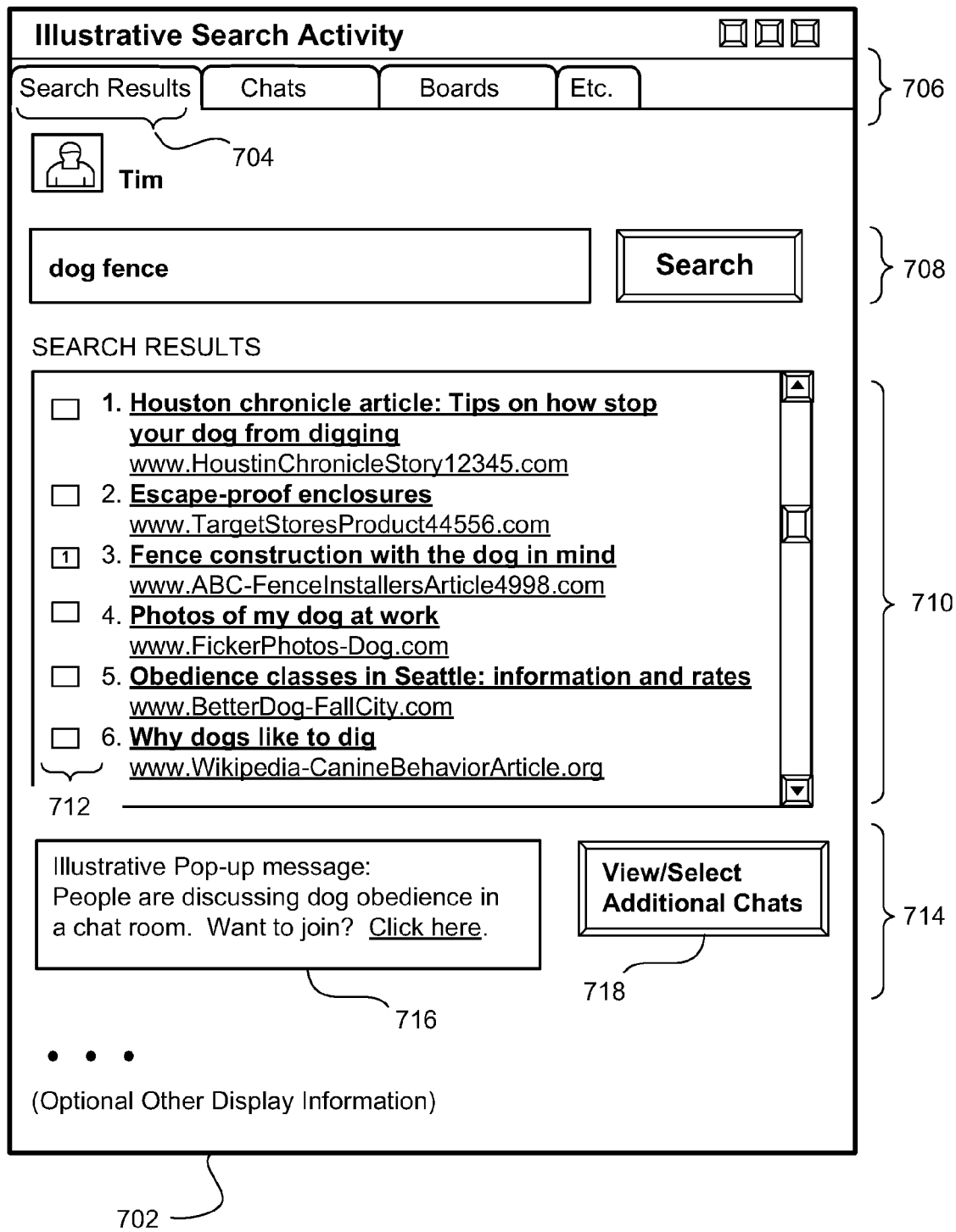
FIG. 7 shows an illustrative user interface presentation that can be generated by the communication system of FIG. 6, here showing a search page that provides a portal to a communication exchange.
Figure 8:
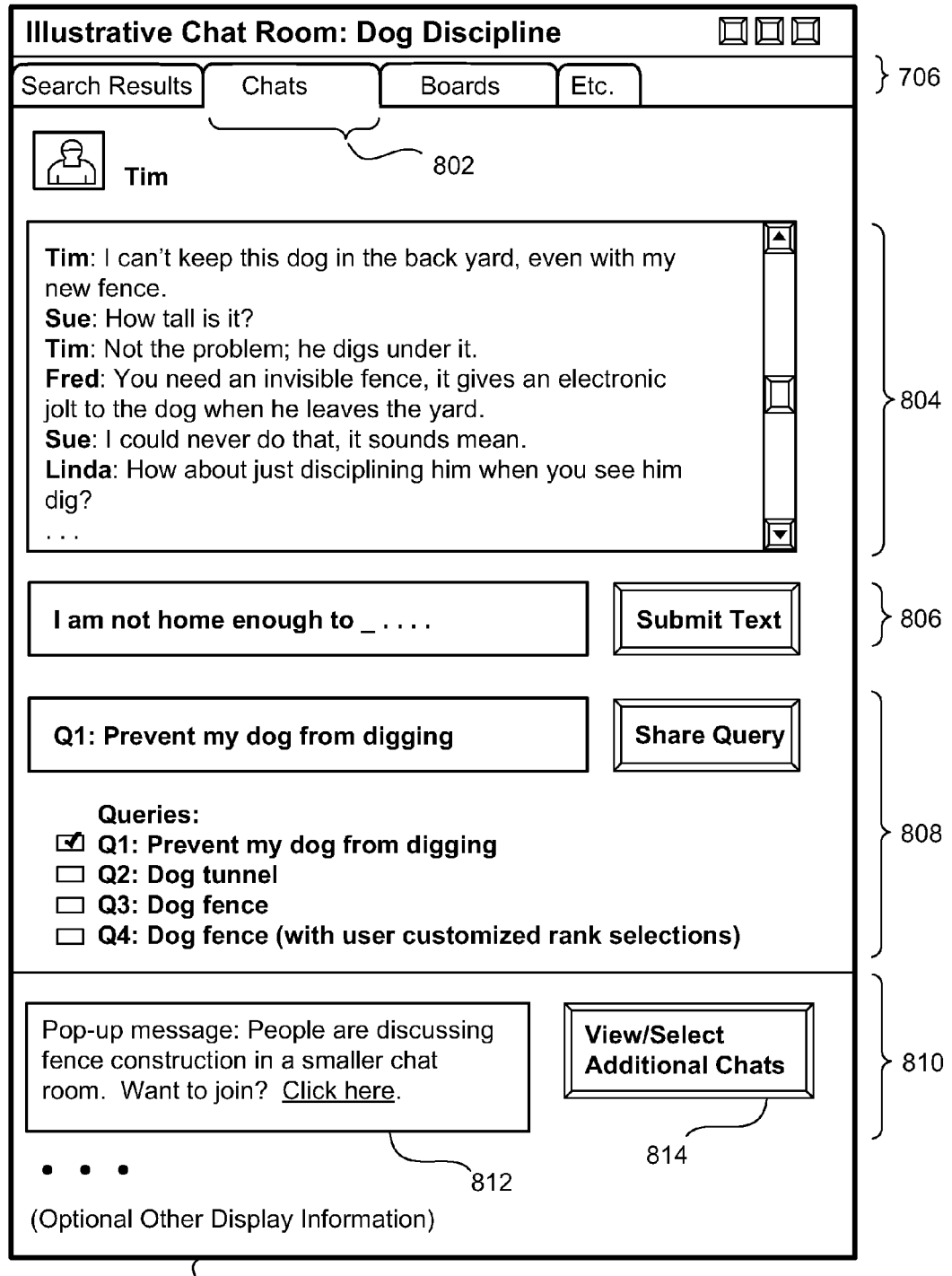
FIG. 8 shows another illustrative user interface presentation that can be generated by the communication system of FIG. 6, here showing a page including a chat-based communication exchange that is associated with the user's search-related behavior performed via the search page of FIG. 7.
Figure 9:
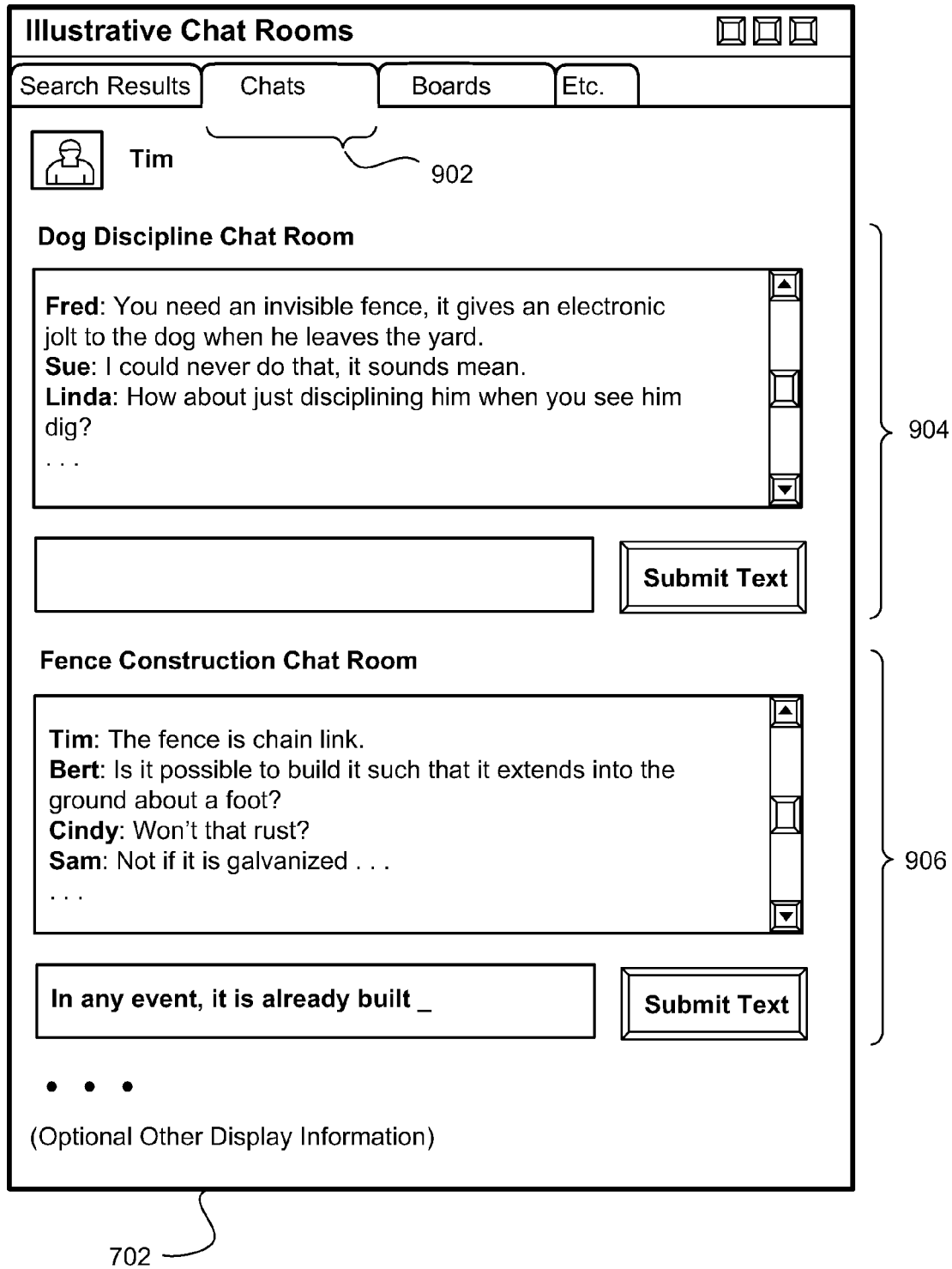
FIG. 9 shows another illustrative user interface presentation that can be generated by the communication system of FIG. 6, here showing a page that includes multiple chat-type communication exchanges.

FIG. 6 shows one illustrative implementation of the communication system 104 introduced in FIG. 4, while FIGS. 7-9 show various user interface (UI) presentations that may be produced by the communication system 104. The communication system 104 can produce user interface presentations having any functionality, as well as any look and feel; as such, the UI presentations shown in FIGS. 7-9 should be understood as representative and non-limiting.

FIG. 6 shows a number of component modules of the communication system 104, which conceptually correspond to different functions performed by the communication system 104. A discussion selection and management module 602 allows a user to select new communication exchanges, exit existing communication exchanges, alter the behavior of existing communication exchanges, and so forth. For example, the discussion selection and management module 602 can include a mechanism which allows a user to view a list of available communication exchanges and to select one or more communication exchanges from the list.

A discussion participation module 604 allows a user to interact with one or more existing communication exchanges. For example, the discussion participation module 604 may include interface functionality that displays the content of a communication exchange, along with interface functionality that allows a user to submit messages to the communication exchange.

A query sharing module 606 allows a user to share a query with other members of a communication exchange (in an illustrative manner that will be described in the context of the discussion of FIG. 8 below).

A result ranking module 608 allows a user to rank or otherwise emphasize selected search result items provided by the search engine 106 (in an illustrative manner that will be described in the context of FIG. 7 below). The user may then share ranked search results with other members of a communication exchange.

A participant ranking module 610 allows a user to rank the value of another participant in a communication exchange (from the perspective of the user performing the ranking). The discussion facilitating system 102 can use this information to assess the expertise or some other characteristic of the participant, which, in turn, allows the discussion facilitating system 102 to make a more informed decision regarding how to group this participant with other users in the future.

The communication system 104 may include yet other features, as indicated by the caption "other system features" 612. Further, other implementations of the communication system 104 may omit one or more of the component modules shown in FIG. 6.

The communication system 104 also includes a user interface module 614 which allows the communication system 104 to communicate with the end users.

FIG. 7 shows an illustrative UI presentation 702 produced by the communication system 104 of FIG. 6, in cooperation with the discussion facilitating system of FIG. 3. In the illustrated scenario, the user is in the process of performing a search. As such, the user is interacting with a search page 704 of a multi-page presentation. The user may select a page of the multi-page presentation via a tabbed menu section 706. There are many other ways to integrate search-related functionality with communication-exchange-related functionality, and, as such, the depiction shown in FIGS. 7-9 should be understood as representative and non-limiting. For instance, the communication system 104 can integrate the search-related functionality and the exchange-related functionality on the same page, such as by displaying a chat-type exchange or the like in a panel adjacent to the search results.

In the present example, the UI presentation 702 includes a query-entry section 708 in which the user has entered the illustrative query "dog fence." Here, the user owns a dog which has been digging tunnels under a backyard fence. The user may be conducting this search shown in FIG. 7 to find a solution to the problem or to generally converse with others about the issue.

The UI presentation 702 includes a result section 710 which displays text links and text snippets associated with network resources (e.g., web sites) which relate to the user's query. The search engine 106 may rank the results in result section 710 based on their order of relevancy, as assessed by whatever ranking algorithm that the search engine 106 happens to use. In addition, the UI presentation 702 may include a ranking interface mechanism 712 which allows a user to adjust the rank of the items in the search results, or to more simply bookmark one or more items in the search results as noteworthy. In the illustrative case of FIG. 7, the user has indicated that the third item in the search results (a link entitled "Fence construction with the dog in mind") is relevant to his or her needs. The UI presentation 702 can allow the user to re-rank or otherwise bookmark the search results using any type of mechanism or combination of mechanisms, not limited to the representative ranking interface mechanism 712 shown in FIG. 7.

The UI presentation 702 may include another interface section 714 which allows the user to access one or more communication exchanges that may have a bearing on the user's search activity. Again, the UI presentation 702 can employ any type or combination of types of interface mechanisms to accomplish this task. For example, the UI presentation 702 includes an illustrative interface section 716 that provides a pop-up message or the like which alerts the user to the existence of a communication exchange (in this case a chat-type exchange) which may have a bearing on the user's search objectives. In this case, the communication management module 310 has implicitly or explicitly determined that the user appears to be interested in a topic related to dog obedience, as can be gleaned, in part, from the terms in the query itself and from the resources that the user may have accessed in response to receiving the search results. Hence, in this case, presume that the discussion facilitating system 102 invites the user to join an ongoing conversation relating to dog obedience, as conveyed by the pop-up message in the interface section 716.

In addition, or alternatively, the UI presentation 702 may include an interface mechanism 718 which allows a user to independently investigate the available communication exchanges. For example, by activating the interface section 718, the discussion facilitating system 102 can present a list of available communication exchanges. The discussion facilitating system 102 can order the list based on assessed relevance of the exchanges to the user's prevailing interests. In addition, or alternatively, the user can explore relevant communication exchanges by activating the Chat, Forum, etc. tabs of the tabbed menu section 706. Again, these interface mechanisms are a few among many options that a user may use to access a relevant communication exchange.

In addition, the user can directly investigate the availability of relevant topics outside the context of a search session. In this context, the user's interests may be assessed based on the user's search history and/or any other factor or combination of factors.

Assume that the user responds in an affirmative manner to the invitation within the interface section 716. In response, the communication system 104 can direct the user to a chat-type communication exchange, as shown in FIG. 8, in which the topic of dog obedience is being discussed.

In particular, a chat-related page 802 of the UI presentation 702 may include a message display section 804 in which messages that have been submitted to the chat room are displayed. In one case, the communication system 104 does not persist the messages in the chat room, such that, when the last person leaves the room, the contents of the chat room are effectively deleted. In another case, the communication system 104 can persist the contents of a chat room, such that one or more users can return to a chat room that has remained inactive for some time. The latter case may allow a user to pose a question to the chat room and then return at a later time to determine whether the question has been answered by a participant. In other words, this feature allows the chat room to function, in some respects, in the manner of a message board.

The UI presentation 702 also includes an interface section 806 which allows the user, Tim, to submit messages to the chat room.

The UI presentation 702 also includes a query-sharing section 808 that allows a user to select one or more prior queries and then to share those queries with other members of the chat room. For example, the user has selected the query "Q1: Prevent my dog from digging" because the user regards this query as particularly effective in addressing his needs, and therefore potentially useful in addressing the needs of others in the chat room. In this example, the list of queries in query-sharing section 808 corresponds to the queries that the user, Tim, has previously made himself. One or more of the queries (e.g., Q4) may include a customized ranking or bookmarking, as established by Tim through the mechanism shown in FIG. 7 or other type of ranking mechanism. Alternatively, or in addition, the communication system 104 can display one or more queries that have generally proved to be useful in addressing a particular issue, e.g., based on feedback gleaned from multiple chat room conversations on the same topic.

In the context illustrated in FIGS. 7 and 8, the user can apply the ranking and sharing features in the course of a substantially real-time discussion, such as, but not limited to, a chat room experience, etc. And that discussion involves participants who may be dynamically and automatically discovered and selected using the functionality described above in Section A.3. Although the ranking and sharing are shown as integrated with a search experience, the communication system 104 can allow the user to rank and share queries independently of the presentation of search results.

The UI presentation 702 can also include another interface section 810 which allows the user to join another communication exchange. In one case, this interface section 810 can be used to exit the current communication exchange regarding the topic of dog obedience taking place in the message display section 804. In another case, the interface section 810 can allow the user to join another communication exchange without leaving the dog obedience exchange. In the latter scenario, the user, Tim, will be simultaneously active in two or more communication exchanges. In the event that the user does decide to exit the present communication exchange on dog obedience, the communication system 104 can alert the other participants of the dog obedience communication exchange that the user has left, and optionally provide the other participants with information regarding the new chat room that the user has joined. This might provide other participants with an opportunity to follow the user, Tim, into the new chat room if they wish to continue their conversation with this user. The user, Tim, may be given the option to enable or disable such a participant-notification feature.

Assume that an interface section 812 notifies the user of another chat room that addresses the issue of fence construction. The discussion facilitating system 102 may suggest this particular chat room because it notes that the membership in the existing chat room (on the general topic of dog obedience) is growing too large and unwieldy. In addition, or alternatively, the discussion facilitating system 102 may examine the messages presented in the current chat room to determine that Tim and a subset of like-minded participants appear to be talking about fences. Hence, the discussion facilitating system 102 may invite the user to take part in another chat room that addresses the subject of fences, which may include fewer participants than the current chat room. In addition, another interface section 814 may give the user the option of independently investigating and manually selecting other communication exchanges.

FIG. 9 shows another depiction of a chat page 902. In this case, the user is taking part in two chat rooms, a first chat room which appears in message display section 904 (relating to dog obedience) and a second chat room which appears in message display section 906 (relating to fence construction). The user may take part in any number of chat rooms (or other types of communication exchanges) in a like manner. If there are too many chat rooms to present on a single page, the communication system 104 may allow the user to switch between chat rooms, e.g., via a menu selection mechanism or the like.

Further, the user may find it effective to toggle back and forth between a chat-type communication exchange and a message board-type communication exchange. This is because the chat-type communication exchange may be more effective in conducting an ongoing stream of discussion flow, while a message board may be more effective in addressing specific questions. Different types of communication exchanges can also be internally linked. For example, a chat room experience may provide a pop-up message which alerts the users to a potentially relevant message board-type exchange, and a message board-type exchange may include a message which alerts the users to a potentially relevant chat-type exchange. Still other hybrid combinations of communication features are possible.

B. Illustrative Processes

Figure 10:
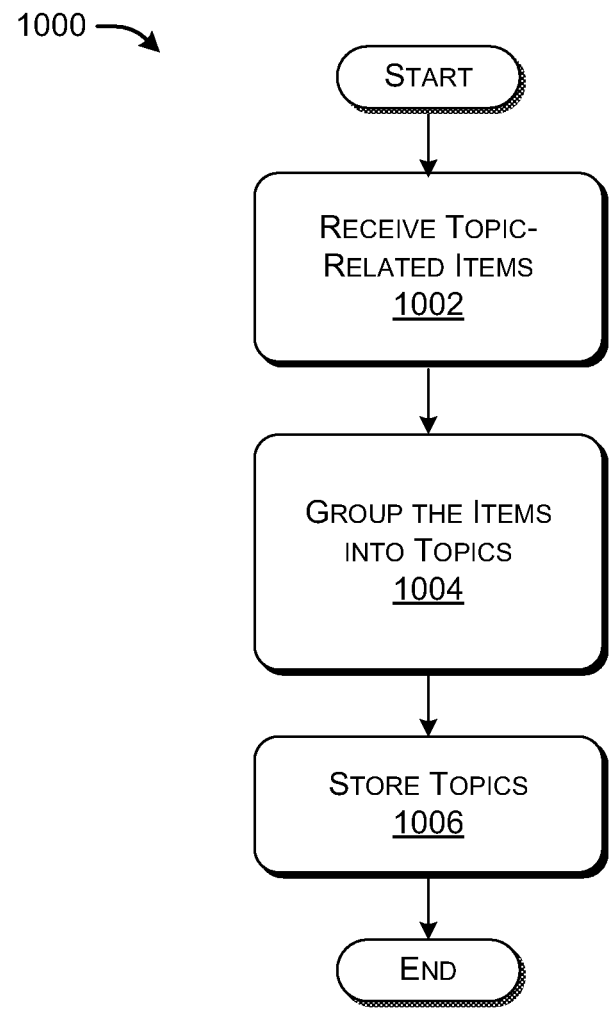
FIG. 10 shows an illustrative procedure for creating a collection of topics using the discussion facilitating system of FIG. 3.
Figure 11:
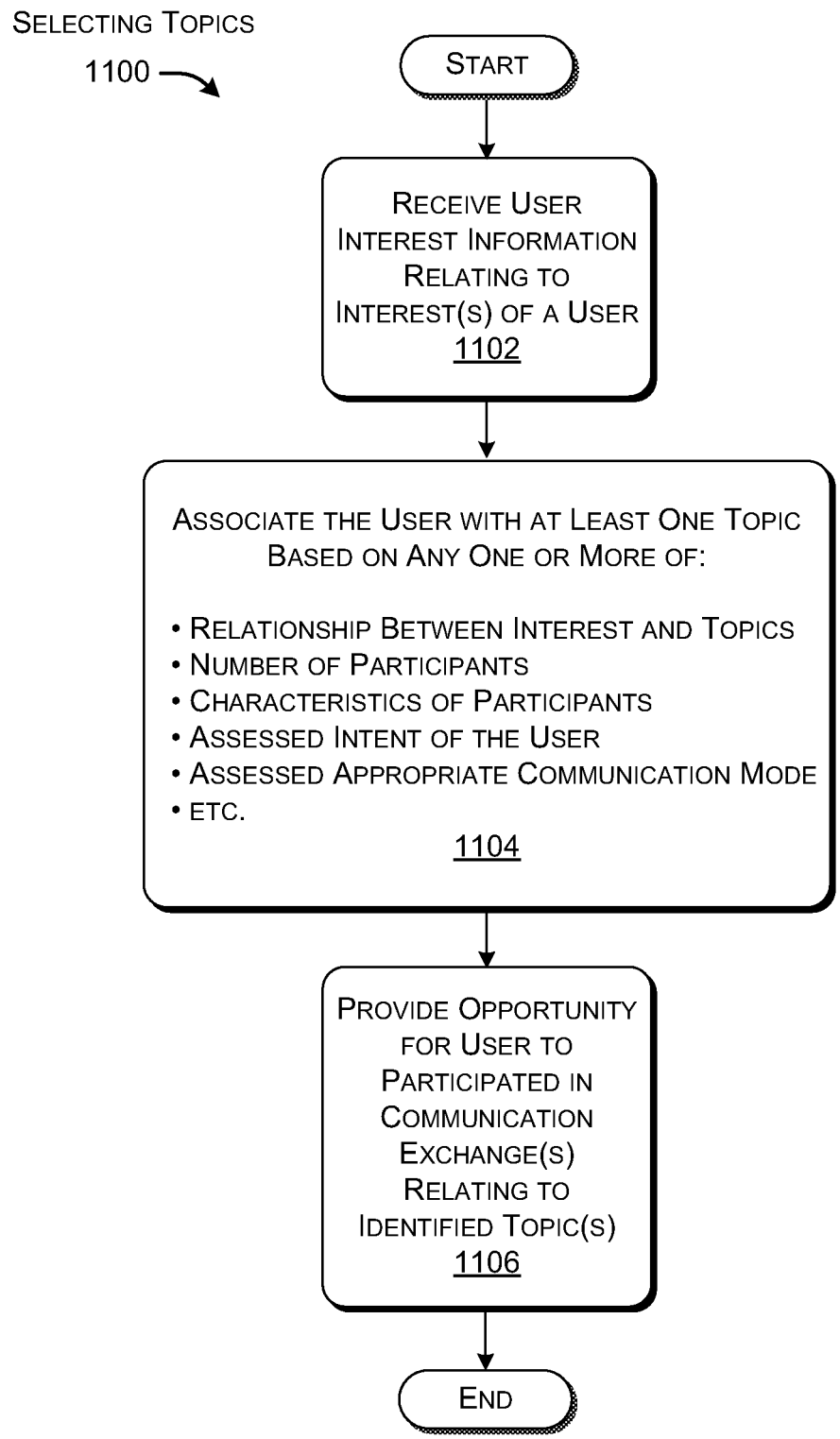
FIG. 11 shows an illustrative procedure for associating a user with one or more of the topics in a collection of topics, using the discussion facilitating system of FIG. 3.
Figure 12:
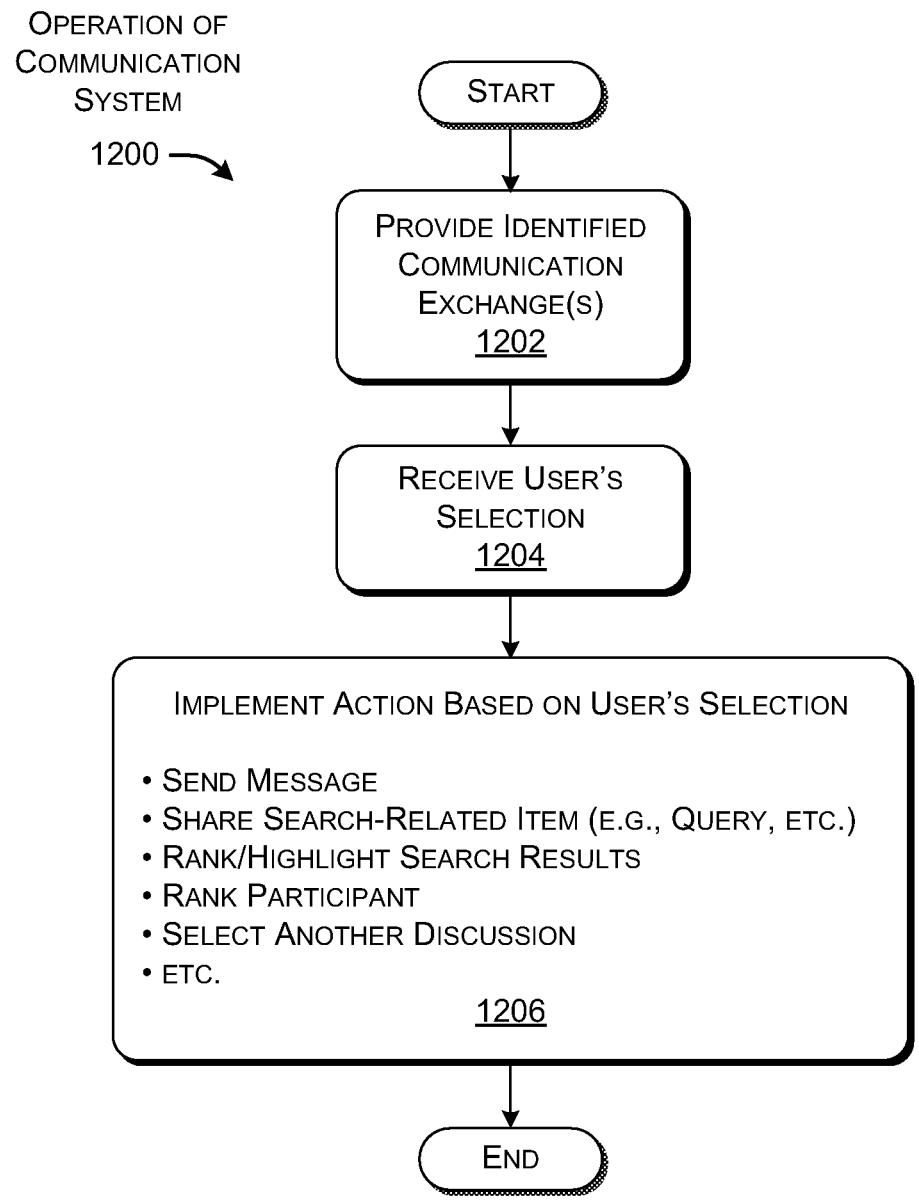
FIG. 12 shows an illustrative procedure for conducting a communication exchange using the communication system of FIG. 6.

FIGS. 10-12 show procedures (1000, 1100, 1200) that explain the operation of the system 100 of FIG. 1 in flowchart form. Since the principles underlying the operation of the system 100 have already been described in Section A, certain operations will be addressed in summary fashion in this section.

B.1. Creating a Collection of Topics

FIG. 10 shows a procedure 1000 for creating a collection of topics according to one illustrative approach. In block 1002, the topic creation module 302 (of FIG. 3) receives topic-related items which, for instance, may reflect the interests of a population of users. In one case, the topic-related items may reflect the queries submitted by a plurality of users, together with information regarding the network resources that the users have accessed after submitting the queries (or, more generally, the network resources that the users have accessed in some time frame related to the submission of the queries). As described above, the topic-related items may also originate from a variety of other sources.

In block 1004, the topic creation module 302 can organize the topic-related items into groups. In one case, the topic creation module 302 can use any type of technique to assess relatedness among topic-related items, and any type of grouping algorithm to organize the topic-related items into a plurality of groups. The topics within the collection of topics may be related to each other in any way, including a hierarchical arrangement or a non-hierarchical arrangement.

In block 1006, the topic creation module 302 can store the collection of topics. The collection of topics may be associated with a plurality of communication exchanges in the manner described above.

B.2. Matching a User with a Topic

FIG. 11 shows a procedure 1100 for matching a user with an appropriate topic (or topics) and associated communication exchange (or exchanges) at a particular point in time. In generally, the discussion facilitating system 102 aims to match the user with a topic (or topics) which match the presumed interests of the user, as represented by interest information.

In block 1102, the discussion facilitating system 102 receives interest information which reflects the interests of the user. The interest information may correspond to the network-related behavior exhibited by the user, such as the queries that the user has submitted and the network resources that the user has accessed. The interest information may also represent the non-behavioral characteristics of the user.

In block 1104, the discussion facilitating system 102 matches the user with one or more topics in the collection of topics, together with one or more communication exchanges associated with the topics. The discussion facilitating system 102 can take into account any factor or combination of factors described above in making this determination. Such factors include the relatedness between the interest information and a given topic, the number of participants already engaged in a discussion regarding that topic, the characteristics of the users taking part in the discussion regarding the topic, the assessed intent of the user in performing a search, the assessed appropriateness of a particular mode of discussion, and so on.

In block 1106, the discussion facilitating system 102 gives the user the opportunity to take part in one or more communication exchanges. The communication system 104 may implement such an invitation, for example, in any of the ways illustrated in FIGS. 7-9. For example, the discussion facilitating system 102 may display a pop-up message or the like which alerts the user to the existence of a relevant communication exchange in the course of the user's interaction with a search engine.

B.3. Interacting with a Communication Exchange

FIG. 12 shows a procedure 1200 which allows a user to interact with a communication exchange. This procedure is performed by the communication system 104 in cooperation with the discussion facilitating system 102.

In block 1202, the communication system 104 provides the user with a communication exchange, which may correspond to a user interface presentation that provides a chat-room-type exchange, a message-board-type exchange, or some other type of exchange or combination of exchanges. In addition, or alternatively, the communication system 104 can provide a communication exchange involving spoken-word-type communication (e.g., voice-over-IP, etc.).

In block 1204, the communication system 104 receives the user's instruction to carry out an action.

In block 1206, the communication system 104 carries out the user's instruction. For example, the communication system 104 may send a message to the communication exchange, share information with other participants, rank the contribution of another participant, and so forth. In addition, the communication system 104 can carry out the user's instruction to activate one or more other communication exchanges.

C. Representative Processing Functionality

FIG. 13 sets forth illustrative electrical data processing functionality 1300 that can be used to implement any aspect of the functions described above. With reference to FIGS. 1 and 2, for instance, the type of processing functionality 1300 shown in FIG. 13 can be used to implement any aspect of the discussion facilitating system 102, the communication system 104, the search engine 106, the user devices (204, 206, 208), and so on. In one case, the processing functionality 1300 may correspond to any type of computing device that includes one or more processing devices.

The processing functionality 1300 can include volatile and non-volatile memory, such as RAM 1302 and ROM 1304, as well as one or more processing devices 1306. The processing functionality 1300 also optionally includes various media devices 1308, such as a hard disk module, an optical disk module, and so forth. The processing functionality 1300 can perform various operations identified above when the processing device(s) 1306 executes instructions that are maintained by memory (e.g., RAM 1302, ROM 1304, or elsewhere). More generally, instructions and other information can be stored on any computer readable medium 1310, including, but not limited to, static memory storage devices, magnetic storage devices, optical storage devices, and so on. The term computer readable medium also encompasses plural storage devices. The term computer readable medium also encompasses signals transmitted from a first location to a second location, e.g., via wire, cable, wireless transmission, etc.

The processing functionality 1300 also includes an input/output module 1312 for receiving various inputs from a user (via input modules 1314), and for providing various outputs to the user (via output modules). One particular output mechanism may include a presentation module 1316 and an associated graphical user interface (GUI) 1318. The processing functionality 1300 can also include one or more network interfaces 1320 for exchanging data with other devices via one or more communication conduits 1322. One or more communication buses 1324 communicatively couple the above-described components together.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
    receiving interest information associated with a user;
    associating the user with a first topic based on the interest information;
    inviting the user to participate in a first communication exchange relating to the first topic, the first communication exchange including a plurality of participants associated with an ongoing discussion of the first topic;
    analyzing, by one or more processing devices, the ongoing discussion of the first topic;
    creating, based at least in part on the analysis of the ongoing discussion of the first topic, a second communication exchange relating to a second topic that is associated with the first topic; and
    inviting the user and a subset of the plurality of participants to participate in the second communication exchange.

2. The method of claim 1, wherein the interest information is based partly on at least one query provided by the user to a search engine.

3. The method of claim 1, wherein the interest information is based on at least one characteristic of the user.

4. The method of claim 1, wherein the first topic is selected with reference to a collection of topics and the collection of topics is associated with a plurality of communication exchanges, and wherein the associating the user with the first topic is based on an assessment that a number of the plurality of participants associated with the ongoing discussion of the first topic meets or exceeds a minimum number of participants or is less than a maximum number of participants.

5. The method of claim 1, wherein the interest information is based on behavior exhibited by the user, and wherein the associating the user with the first topic is based on an assessment of an intent of the user in engaging in the behavior.

6. The method of claim 1, wherein the first and second communication exchanges include at least one of a chat-type communication exchange or a message board-type communication exchange.

7. A system comprising:
    one or more processing devices; and
    one or more storage devices comprising instructions that, when executed by the one or more processing devices, configure one or more computing devices to:
    receive items from a plurality of users;
    determine that the items are related and that the plurality of users have a common interest in a same topic;
    create a communications exchange group based on determining that the items are related and that the plurality of users have the common interest in the same topic; and
    invite the plurality of user to participate in the communications exchange group to discuss the same topic.

8. The system of claim 7, wherein the items comprise search queries and the same topic is associated with a recent news event.

9. The method of claim 1, wherein the second topic is a sub-topic of the first topic, and the analysis of the ongoing discussion identifies keywords that distinguish the sub-topic within the ongoing discussion of the first topic.

10. The method of claim 1, further comprising:
   determining that a number of participants associated with the first communication exchange meets or exceeds a threshold number of participants; and
   splitting up the plurality of participants between the first communication exchange and the second communication exchange to reduce the number of participants associated with the first communication exchange.

11. The method of claim 10, wherein the threshold number of participants indicates that the first communication exchange is overcrowded.

12. The method of claim 1, further comprising:
   determining that the user and the subset of the plurality of participants are associated with a common geographical origin; and
   inviting the user and the subset of the plurality of participants to participate in the second communication exchange based partly on the association with the common geographical origin.

13. The method of claim 1, further comprising inviting the user to participate in the second communication exchange relating to the second topic while the user is participating in the first communication exchange relating to the first topic.

14. The method of claim 13, further comprising permitting the user to simultaneously participate in both the first communication exchange and the second communication exchange.

15. The method of claim 4, wherein the second communication exchange is not included in the plurality of communication exchanges and the second communication is created after receiving the interest information associated with the user.

16. The system of claim 7, wherein the instructions further configure the one or more computing devices to:
   analyze a discussion of the same topic in the communications exchange group;
   create, based at least in part on the analysis of the discussion, another communications exchange group relating to another topic; and
   invite a subset of the plurality of users to participate in the another communications exchange.

17. The system of claim 16, wherein the another topic is a more specific topic compared to the same topic, and the analysis of the discussion of the same topic identifies keywords that distinguish the another topic within the discussion of the same topic.

18. The system of claim 7, wherein the instructions further configure the one or more computing devices to:
   determine that the subset of the plurality of users are associated with a common geographical origin; and
   invite the subset of the plurality users to participate in the another communications exchange based partly on the association with the common geographical origin.

19. A system comprising:
   one or more processing devices;
   one or more storage devices comprising instructions that, when executed by the one or more processing devices, configure one or more computing devices to:
   receive interest information associated with a user;
   associate the user with a first topic based on the interest information;
   invite the user to participate in a first communication exchange relating to the first topic, the first communication exchange including a plurality of participants associated with an ongoing discussion of the first topic;
   analyze the ongoing discussion of the first topic;
   create, based at least in part on the analysis of the ongoing discussion of the first topic, a second communication exchange relating to a second topic that is associated with the first topic; and
   invite the user and a subset of the plurality of participants to participate in the second communication exchange.

20. The system of claim 19, wherein the second topic is a sub-topic of the first topic, and the analysis of the ongoing discussion of the first topic identifies keywords that distinguish the sub-topic within the ongoing discussion of the first topic.

* * * * *